United States Patent
Sano et al.

(10) Patent No.: US 10,072,590 B2
(45) Date of Patent: Sep. 11, 2018

(54) CONTROL DEVICE AND CONTROL METHOD FOR DIESEL ENGINE

(71) Applicant: NISSAN MOTOR CO., LTD., Yokohama-shi, Kanagawa (JP)

(72) Inventors: Shigehisa Sano, Kanagawa (JP); Isshou Uehara, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 100 days.

(21) Appl. No.: 15/125,752

(22) PCT Filed: Mar. 20, 2014

(86) PCT No.: PCT/JP2014/057779
§ 371 (c)(1),
(2) Date: Sep. 13, 2016

(87) PCT Pub. No.: WO2015/140989
PCT Pub. Date: Sep. 24, 2015

(65) Prior Publication Data
US 2017/0009676 A1    Jan. 12, 2017

(51) Int. Cl.
*F02D 41/00* (2006.01)
*F02B 37/16* (2006.01)
(Continued)

(52) U.S. Cl.
CPC ........ *F02D 41/0007* (2013.01); *F02B 37/168* (2013.01); *F02D 21/08* (2013.01);
(Continued)

(58) Field of Classification Search
CPC .. F02D 41/0007; F02D 41/10; F02D 41/0077; F02D 23/02; F02D 21/08;
(Continued)

(56) References Cited

U.S. PATENT DOCUMENTS

| 2003/0093994 A1* | 5/2003 | Bailey ................ F01N 3/0233 |
| | | 60/605.2 |
| 2005/0109029 A1 | 5/2005 | Busch |
| 2007/0039322 A1* | 2/2007 | Bering ............... F02B 29/0425 |
| | | 60/599 |
| 2007/0125083 A1 | 6/2007 | Rollinger et al. |

(Continued)

FOREIGN PATENT DOCUMENTS

| DE | 102 03 309 A1 | 7/2003 |
| EP | 3 020 939 A1 | 5/2016 |

(Continued)

*Primary Examiner* — Hoang Nguyen
(74) *Attorney, Agent, or Firm* — Drinker Biddle & Reath LLP

(57) ABSTRACT

A control device for diesel engine controls a diesel engine with a turbo charger that coaxially joins an intake compressor and an exhaust turbine, and drives the intake compressor with energy of exhaust gas which flows into the exhaust turbine to pressurize intake air, and a fresh air/secondary air supply device that supplies fresh air or secondary air to an exhaust passage upstream of the exhaust turbine. The control device for diesel engine includes a gas flow stagnation region determination means that determines whether engine operation conditions or a state of the turbo charger are/is in a gas flow stagnation region, and a fresh air/secondary air supply means that supplies fresh air or secondary air to the exhaust passage upstream of the exhaust turbine by the fresh air/secondary air supply device when the engine operation conditions or the state of the turbo charger are/is in a gas flow stagnation region.

15 Claims, 23 Drawing Sheets

(51) Int. Cl.
*F02M 26/21* (2016.01)
*F02D 23/00* (2006.01)
*F02D 21/08* (2006.01)
*F02M 26/25* (2016.01)
*F02M 26/04* (2016.01)
*F02D 23/02* (2006.01)
*F02D 41/10* (2006.01)

(52) U.S. Cl.
CPC .............. *F02D 23/00* (2013.01); *F02D 23/02* (2013.01); *F02D 41/0077* (2013.01); *F02M 26/04* (2016.02); *F02M 26/21* (2016.02); *F02M 26/25* (2016.02); *F02D 41/005* (2013.01); *F02D 41/0055* (2013.01); *F02D 41/10* (2013.01); *Y02T 10/144* (2013.01)

(58) Field of Classification Search
CPC .... F02D 23/00; F02D 41/005; F02D 41/0055; F02M 26/04; F02M 26/21; F02M 26/25; F02B 37/168; Y02T 10/144
USPC ............ 60/600, 602, 605.1, 605.2, 607, 608
See application file for complete search history.

(56) References Cited

U.S. PATENT DOCUMENTS

| | | | |
|---|---|---|---|
| 2008/0041051 A1* | 2/2008 | Silbermann | F01N 3/021 60/605.2 |
| 2008/0134677 A1* | 6/2008 | Onodera | F02B 37/00 60/601 |
| 2010/0139266 A1* | 6/2010 | Gerum | F02B 21/00 60/600 |
| 2013/0080034 A1* | 3/2013 | Chi | F02D 41/0065 701/108 |
| 2013/0160429 A1 | 6/2013 | Cattani et al. | |
| 2013/0305709 A1 | 11/2013 | Rollinger et al. | |
| 2013/0311068 A1 | 11/2013 | Rollinger et al. | |

FOREIGN PATENT DOCUMENTS

| | | |
|---|---|---|
| GB | 1 520 372 A | 8/1978 |
| JP | S53-9644 B2 | 4/1978 |
| JP | H06-323152 A | 11/1994 |
| JP | 2005-121029 A | 5/2005 |
| JP | 2006-105026 A | 4/2006 |
| JP | 2012-167638 A | 9/2012 |
| JP | 2012-202315 A | 10/2012 |

* cited by examiner

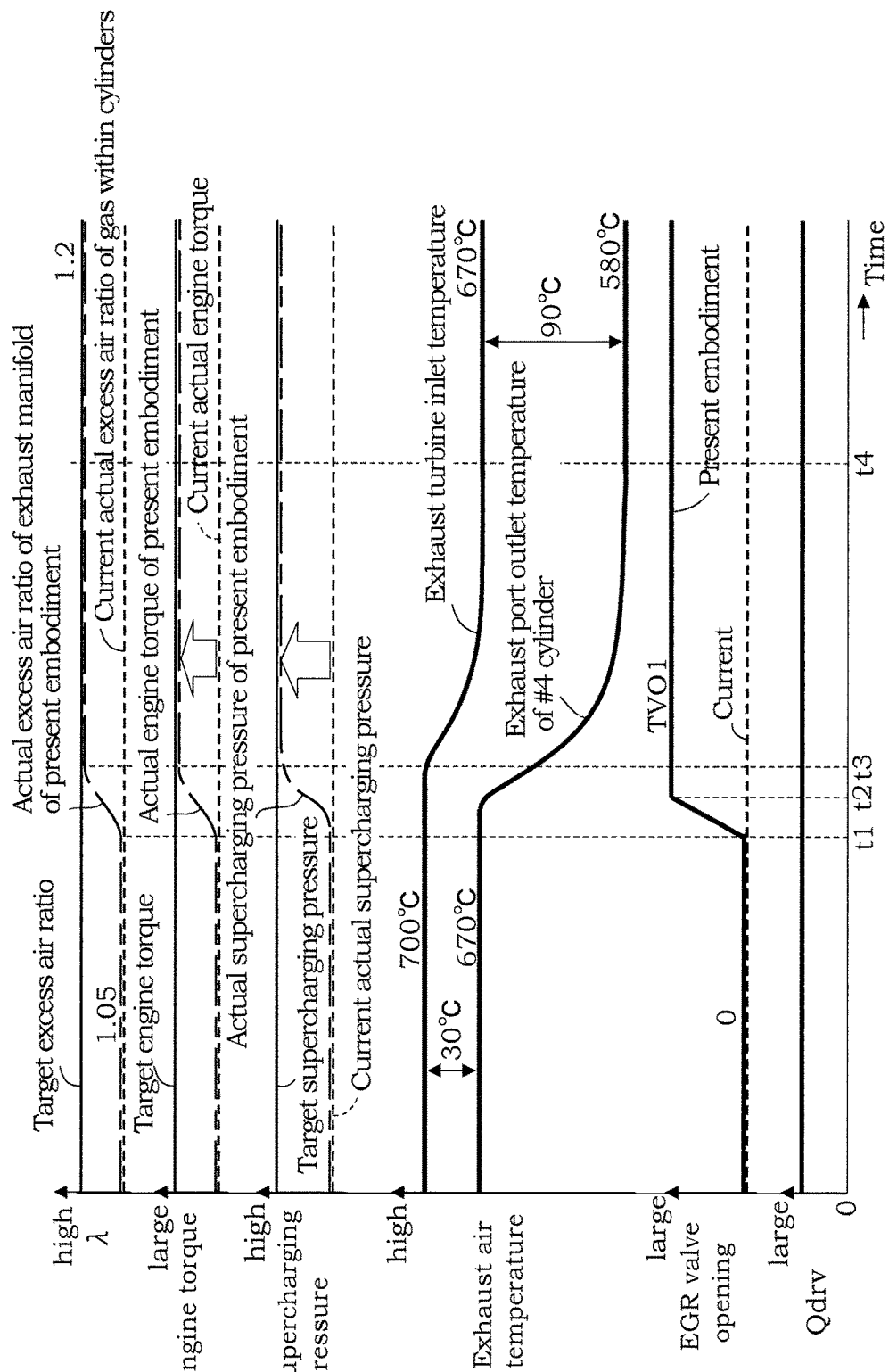

CONTROL DEVICE AND CONTROL METHOD FOR DIESEL ENGINE

TECHNICAL FIELD

The present invention relates to a control device and a control method for a diesel engine equipped with a turbo charger.

BACKGROUND ART

JP2012-167638A discloses an engine equipped with a turbo charger and an EGR control device, wherein when an intake air pressure downstream of an intake turbine is higher than an exhaust gas pressure upstream of an exhaust turbine, an EGR valve is fully closed even when the engine operation conditions are in an EGR region. In the case that the intake air pressure downstream of the intake turbine is higher than the exhaust gas pressure upstream of the exhaust turbine, if fresh air downstream of the intake turbine is supplied to an exhaust passage, the amount of oxygen in a three-way catalyst becomes higher than necessary. Thus, in order to prevent such an increase, the EGR valve is controlled to the fully closed state even in the EGR region.

SUMMARY OF INVENTION

In a diesel engine, the actual engine torque can be increased by increasing the amount of fuel supplied to the cylinders. Thus, when starting a vehicle or the like, the excess air ratio of gas within the cylinders is controlled to a value near 1.0. When the excess air ratio of gas within the cylinders reaches a value near 1.0 (for example, 1.1 or 1.05), the engine enters a state in which the actual engine torque does not rise even if the amount of fuel is further increased, because the engine operation conditions or the state of the turbo charger are/is in a gas flow stagnation region. There has been a problem in that the desired acceleration feeling cannot be obtained if the engine operation conditions or the state of the turbo charger are/is in a gas flow stagnation region when starting the vehicle or the like. However, JP2012-167638A does not disclose anything regarding this problem.

Thus, an object of the present invention is to enable the actual engine torque to be increased even when the engine operation conditions or the state of the turbo charger are/is in a gas flow stagnation region.

According to one embodiment of the present invention, a control device for diesel engine controls a diesel engine with a turbo charger that coaxially joins an intake compressor and an exhaust turbine, and drives the intake compressor with energy of exhaust gas which flows into the exhaust turbine to pressurize intake air, and a fresh air/secondary air supply device that supplies fresh air or secondary air to an exhaust passage upstream of the exhaust turbine. The control device for diesel engine includes a controller that is programmed to determine whether engine operation conditions are in a gas flow stagnation region and to supply fresh air or secondary air to the exhaust passage upstream of the exhaust turbine by the fresh air/secondary air supply device when the engine operation conditions are in a gas flow stagnation region, in which an engine torque does not increase even when a fuel injection amount is increased and in which fresh air or secondary air can be supplied to the exhaust passage upstream of the exhaust turbine.

BRIEF DESCRIPTION OF DRAWINGS

FIG. 3 is a timing chart illustrating changes in the excess air ratio, engine torque, supercharging pressure, exhaust gas temperature, EGR valve opening degree, and main fuel injection amount when starting a vehicle;

DESCRIPTION OF EMBODIMENTS

Embodiments of the present invention will now be explained below with reference to the attached drawings.

First Embodiment

Figure 1:
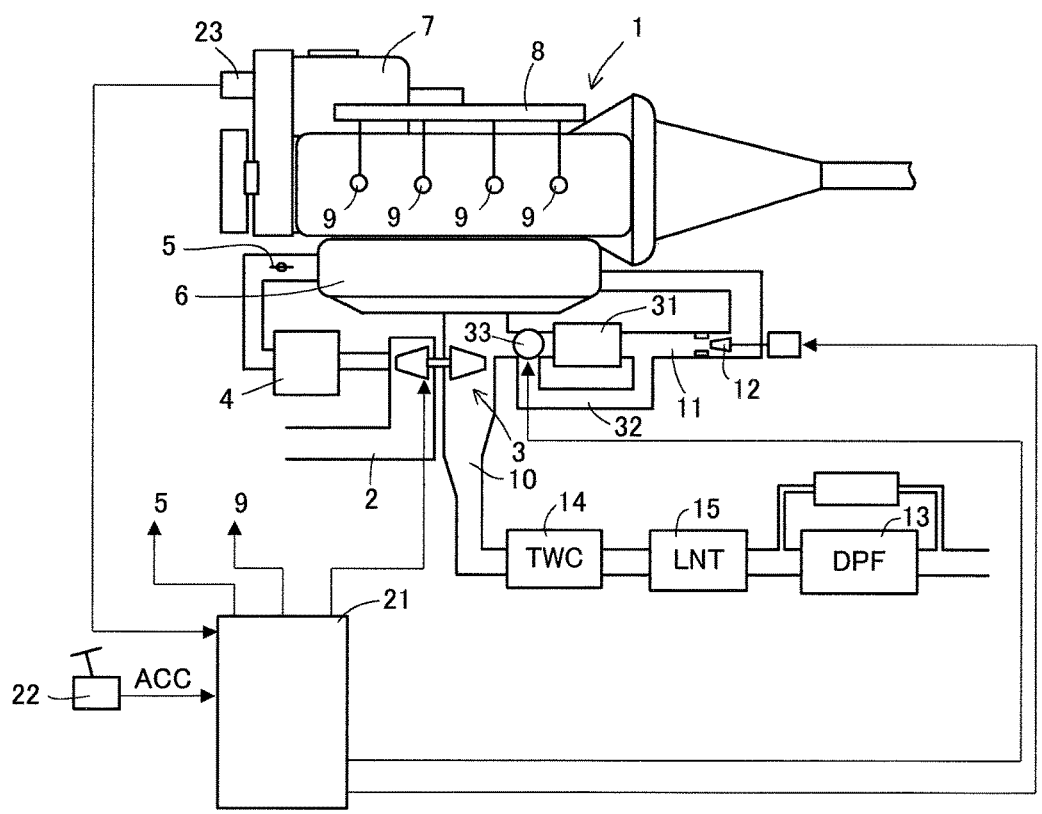
FIG. 1 is a schematic constitutional view of a diesel engine control device according to a first embodiment of the present invention.
Figure 2A:
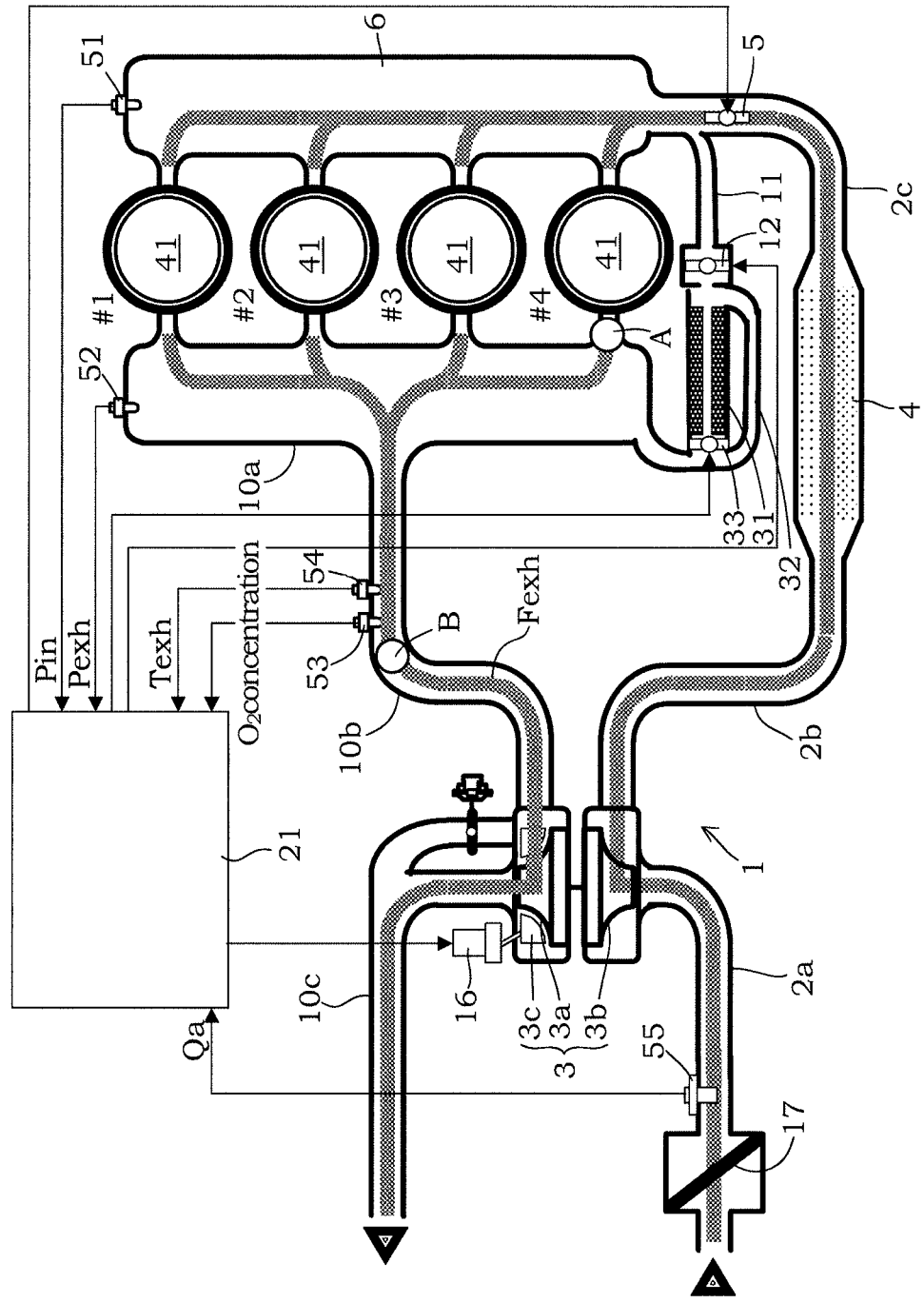
FIG. 2A is a schematic constitutional view illustrating the essential parts of the engine and a close-up of a turbo charger of the first embodiment.
Figure 2B:
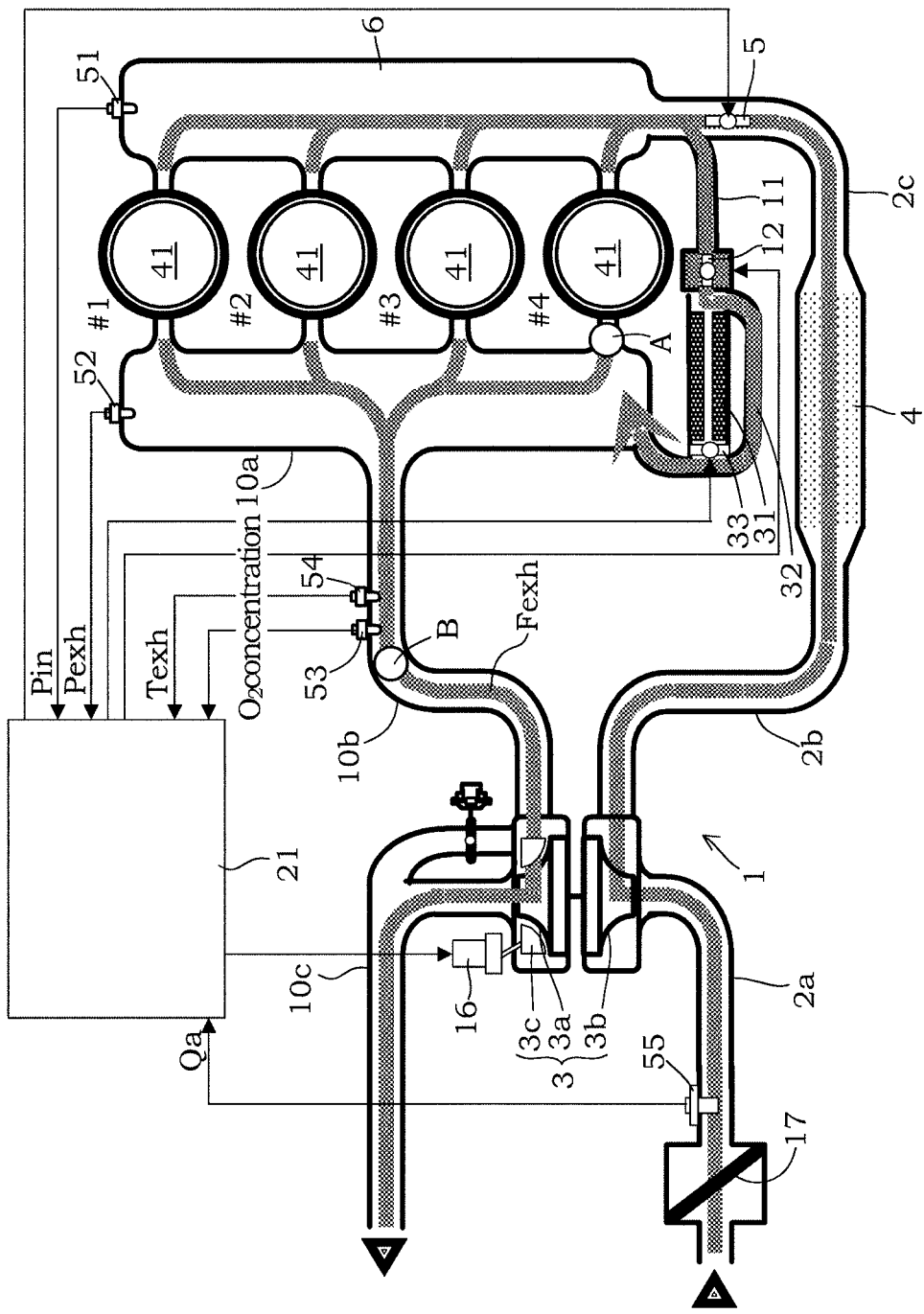
FIG. 2B is a schematic constitutional view illustrating the essential parts of the engine and a close-up of the turbo charger of the first embodiment.

FIG. 1 is a schematic constitutional view of a control device of a diesel engine 1 according to a first embodiment of the present invention. Hereinafter, the diesel engine will be abbreviated to "engine" as necessary. FIGS. 2A and 2B are schematic constitutional views illustrating the essential parts of the engine 1 and a close-up of a turbo charger 3. FIG. 2A illustrates a state before opening an EGR valve 12 in a gas flow stagnation region, and FIG. 2B illustrates a state after opening the EGR valve 12 in the gas flow stagnation region.

As shown in FIGS. 1 and 2A, an intake compressor 3b of the turbo charger 3 is provided in an intake passage 2 of the diesel engine 1. Intake air is supercharged by the intake compressor 3b, and then cooled by an intercooler 4. The cooled intake air passes through a throttle valve 5, and then flows into a cylinder 41 of each cylinder upon passing through an intake air collector 6. The turbo charger 3 according to the present embodiment is provided with a variable nozzle 3c as shown in FIGS. 2A and 2B, but this variable nozzle 3c is not necessarily required.

Fuel is supplied to the engine 1 by a common rail-type fuel injection device. The fuel is pressurized to a high degree by a high-pressure fuel pump 7 and fed to a common rail 8, and then the fuel is directly injected into the cylinders 41 from fuel injection valves 9 of the cylinders. The air which has flowed into the cylinders 41 and the fuel which has been injected become a mixed gas, and this mixed gas combusts by compression ignition within the cylinders 41. Exhaust gas flows out from the cylinders 41 to an exhaust passage 10.

Some of the exhaust gas which has flowed out to the exhaust passage 10 is recirculated as EGR gas to the intake air side through an EGR passage 11. An EGR valve 12 for flow rate adjustment is installed in the EGR passage 11. As shown in FIGS. 2A and 2B, the intake passage 2 is constituted by an intake pipe 2a which is upstream of the intake compressor 3b, an intake pipe 2b which establishes communication between the intake compressor 3b and an inlet of the intercooler 4, an intake pipe 2c which establishes communication between an outlet of the intercooler 4 and the intake air collector 6, and the like. The EGR passage 11 is downstream of the throttle valve 5 and branches from the intake pipe 2c near the intake air collector 6. The remaining exhaust gas passes through an exhaust turbine 3a of the turbo charger 3 to drive the exhaust turbine 3a. In FIGS. 2A and 2B, "Fexh" indicates the flow of gas.

An EGR cooler 31 is provided in the EGR passage 11. The EGR cooler 31 cools the EGR gas using cooling water or cooling air. Further, a flow path switching valve 33 that switches the flow path of the EGR gas is provided at a branching part of a bypass passage 32 which bypasses the EGR cooler 31. For example, when no power is supplied, the flow path switching valve 33 blocks the bypass passage 32 to cause the EGR gas to flow to the EGR cooler 31, and when power is supplied, the flow path switching valve 33 blocks the passage on the EGR cooler 31 side to cause the EGR gas to flow to the bypass passage 32. The bypass passage 32 and the flow path switching valve 33 are provided as an HC measure during low temperatures.

A four-cylinder engine is explained herein as an example of the engine 1 of the present embodiment. As shown in FIGS. 2A and 2B, in the engine 1, the cylinders are numbered from the top as #1, #2, #3, and #4. The EGR passage 11 is provided adjacent to the cylinder 41 of the #4 cylinder on the outside of the #4 cylinder.

As shown in FIG. 1, signals for an accelerator opening (amount of depression of the accelerator pedal) ACC from an accelerator sensor 22 and an engine rotation speed Ne from a crank angle sensor 23 are input into an engine controller 21. The engine controller 21 calculates a fuel injection timing and fuel injection amount Qdrv of a main injection based on the engine load (accelerator opening) and the engine rotation speed Ne, and outputs a valve-opening command signal corresponding to the fuel injection timing and fuel injection amount Qdrv to a fuel injection valve 9. Further, the engine controller 21 executes EGR control and supercharging pressure control in a coordinated manner so as to obtain a target EGR rate and a target intake air amount. The engine controller 21 is constituted by a microcomputer provided with a central processing unit (CPU), a read only memory (ROM), a random access memory (RAM), and an input/output interface (I/O interface).

A filter (Diesel Particulate Filter) 13 that collects particulates in the exhaust gas is disposed downstream of the exhaust turbine in the exhaust passage 10. If a particulate deposit amount of the filter 13 reaches a predetermined value, the engine controller 21 executes regeneration processing of the filter 13. For example, regeneration processing of the filter 13 is carried out by raising the temperature of the exhaust gas to a temperature at which the particulates combust by performing a post injection during the expansion stroke or exhaust stroke immediately after the main injection. In this way, the particulates which have deposited on the filter 13 combust and are removed, and thereby the filter 13 is regenerated. The post injection amount and post injection timing are predetermined according to the engine operation conditions (load and rotation speed) so as to obtain a target regeneration temperature.

In order to execute complete regeneration in which all of the particulates which have deposited on the filter 13 are removed by combustion, it is necessary to increase the combustion temperature of the particulates even slightly in a range which does not exceed the allowable temperature of the filter 13 during the regeneration process. In the present embodiment, an oxidation catalyst 14 made of a noble metal is disposed upstream of the filter 13. The exhaust gas components (HC, CO) which flow in due to the post injection are combusted by the oxidation catalyst 14 to raise the exhaust gas temperature, and thereby combustion of the particulates is promoted. An oxidation catalyst can also be coated onto a carrier which constitutes the filter 13. In this case, the oxidation reaction that occurs when the particulates combust is promoted, and thereby a bed temperature of the filter 13 can be raised and the combustion of the particulates can be further promoted.

The catalyst is not limited to the oxidation catalyst 14. The oxidation catalyst can be replaced with another catalyst as long as the catalyst has an oxidation function. FIG. 1 illustrates a case in which a three-way catalyst (TWC) is used as the oxidation catalyst 14.

An NOx trap catalyst (LNT) 15 is provided between the oxidation catalyst 14 and the filter 13. The NOx trap catalyst 15 adsorbs NOx (nitrogen oxide) within the exhaust gas in an oxygen atmosphere, and releases the trapped NOx in a reduction atmosphere to perform reduction/purification using HC in the exhaust gas as a reducing agent. An oxygen atmosphere is obtained when the excess air ratio of exhaust gas that has exited the cylinders 41 is greater than 1.0 (a value corresponding to the theoretical air/fuel ratio). On the other hand, a reduction atmosphere is obtained when the excess air ratio of exhaust gas that has exited the cylinders 41 is equal to or less than 1.0.

Therefore, when the NOx deposit amount of the NOx trap catalyst 15 has reached a predetermined value, it is necessary to execute a rich spike process to switch the exhaust gas flowing through the NOx trap catalyst 15 from an oxygen atmosphere to a reduction atmosphere. In the rich spike process, post injection is carried out during the expansion stroke or exhaust stroke immediately after the main injection to increase the amount of unburned HC discharged to the exhaust passage 10 and supply the HC as a reducing agent to the NOx trap catalyst 15.

During normal operation, the diesel engine 1 operates at an excess air ratio (lean-side air/fuel ratio) of a value higher than 1.0 (a value corresponding to the theoretical air/fuel ratio). Thus, the excess air ratio of the exhaust gas cannot be switched to 1.0 only by executing a post injection. Therefore, the amount of intake air flowing into the cylinders 41 (cylinder intake air amount) Qac is decreased by closing the throttle valve 5, which is in a fully opened position in normal operation, during the rich spike process, thereby switching the excess air ratio of exhaust gas that has exited the cylinders 41 to equal to or less than 1.0. In other words, the post injection amount and the throttle valve opening degree (intake air amount) are determined so that the excess air ratio, which is determined by a fuel injection amount Qfuel, which is the total of the main fuel injection amount and the post injection amount, and the cylinder intake air amount Qac, becomes equal to or less than 1.0.

The engine controller 21 calculates the NOx amount per predetermined duration of time that is trapped by the NOx trap catalyst 15 in each predetermined duration of time, and adds the NOx amounts per predetermined duration of time to calculate an NOx deposit amount which is deposited on the NOx trap catalyst 15. This NOx deposit amount is compared to a predetermined threshold, and when the NOx deposit amount has reached or exceeded the threshold, a post injection (rich spike process) for regenerating the NOx trap catalyst 15 is executed.

In this way, when the NOx deposit amount has reached or exceeded the threshold during normal operation, the throttle valve opening degree is constricted from a fully opened state to a predetermined throttle valve opening degree, and the post injection is started accordingly. The post injection is completed after a certain amount of time has elapsed, and the throttle valve 5 is returned to the fully opened position.

In the engine controller 21, a target engine torque and a target excess air ratio according to the engine operation conditions are established. However, when starting the vehicle or when the vehicle is climbing a hill, there is a problem in that a target drive torque cannot be achieved. The engine controller 21 establishes the target drive torque from the accelerator opening and the engine rotation speed, and calculates the target engine torque based on the target drive torque.

Figure 7:
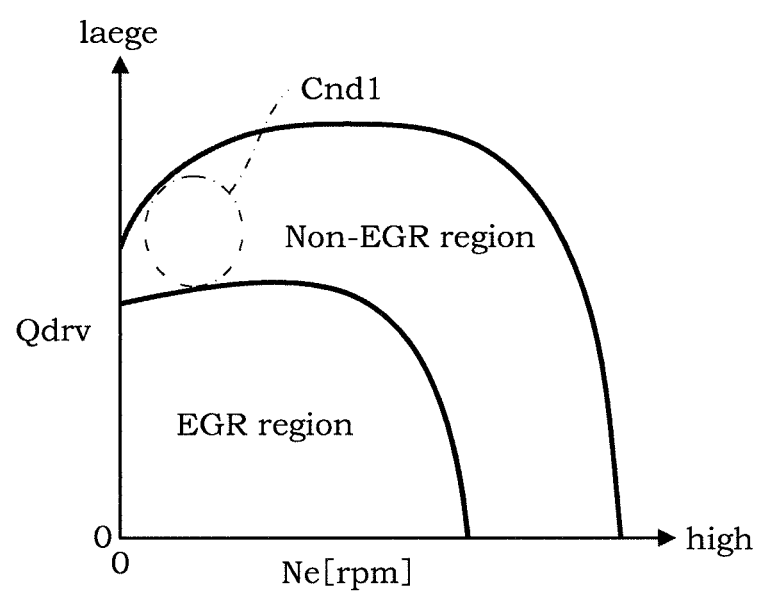
FIG. 7 is an operation region graph of the first embodiment.

Herein, the operation conditions when starting the vehicle or when the vehicle is climbing a hill are in a region of low rotation speed and high load (non-EGR region). As shown in FIG. 7, the operation region is divided into an EGR region and a non-EGR region. In FIG. 7, the portion designated as "Cnd1" indicates the operation conditions when starting the vehicle or when the vehicle is climbing a hill. Hereinafter, the Cnd1 region will be expressed in the case of starting the vehicle.

Since a feeling of acceleration desired by a driver cannot be obtained when starting the vehicle, it is conceivable to increase the amount of fuel (main full injection amount Qdrv) supplied to the engine 1 in order to increase the engine torque. The temperature and pressure of combustion gas exiting from the cylinders 41 rise due to the increase in the amount of fuel, and thus the exhaust gas energy flowing into the exhaust turbine 3a increases. The rotation speed of the exhaust turbine 3a increases due to the increased exhaust gas energy, and thus the rotation speed of the coaxial intake compressor 3b increases. Therefore, the supercharging pressure increases, and a larger amount of fresh air can be pushed into the cylinders 41, and thus the fuel supplied to the cylinders 41 can be further increased. In this way, the engine torque increases when the turbo charger 3 operates well, but there is also a limit to this increase in the engine torque. In other words, if the excess air ratio $\lambda$ of gas, which is a mixture of air and fuel, within the cylinders 41 decreases from a high value to a value near 1.0 (for example, 1.1 or 1.05) due to the increase in the fuel amount, the engine 1 enters a state in which the engine torque does not rise even if the amount of fuel is further increased.

The cause of the above phenomenon is found in the turbo charger 3. If the excess air ratio $\lambda$ of gas within the cylinders 41 approaches 1.0, the oxygen of the gas within the cylinders 41 becomes insufficient and the fuel does not combust completely, and thus the temperature and pressure of the combustion gas no longer rise. If the temperature and pressure of the combustion gas do not rise, the exhaust gas energy flowing into the exhaust turbine 3a does not increase, and thus the gas flow stagnates and the rotation speed of the exhaust turbine 3a settles at a fixed value. If the turbine rotation speed settles at a fixed value, the supercharging pressure does not rise and the intake air pushed into the cylinders 41 does not increase, and thus the engine torque does not increase even if the fuel amount is increased. As described above, in the engine 1 provided with the turbo charger 3, there are cases in which the target drive torque cannot be achieved when starting the vehicle, and the desired acceleration feeling cannot be obtained. If the excess air ratio of the gas within the cylinders 41 approaches 1.0 from a value higher than 1.0, soot (HC) is generated due to insufficient oxygen, but it has been confirmed that the soot remains at a level which causes no problems when the excess air ratio is 1.1 or 1.05.

Thus, in the present embodiment, it is determined on the basis of the operation conditions of the engine 1 whether or not the engine 1 is in a state in which the engine torque will not rise due to the turbo charger 3 even if the fuel amount is increased, such as when starting the vehicle. In other words, conditions in which the operation conditions of the engine 1 are in a gas flow stagnation region are newly established. When these conditions of being in the gas flow stagnation region are met, the EGR valve 12 is opened, and fresh air of the intake pipe 2c downstream of the throttle valve 5 is made to flow via the EGR passage 11 into the exhaust passage 10 upstream of the exhaust turbine 3a. Herein, "fresh air" means intake air that does not include EGR gas.

The conditions of being in the gas flow stagnation region include the following conditions <1> to <3>.

<1> The concentration of oxygen included in the exhaust gas upstream of the oxidation catalyst 14 is less than 5%.

<2> The intake air pressure (supercharging pressure) downstream of the intercooler 4 is higher than the exhaust gas pressure upstream of the exhaust turbine 3a.

<3> The exhaust gas temperature upstream of the exhaust turbine 3a is 700° C. or greater.

FIG. 3 is a timing chart obtained upon verifying how the excess air ratio, engine torque, supercharging pressure, exhaust gas temperature, EGR valve opening degree, and main fuel injection amount Qdrv change when starting the vehicle.

In current engines, starting the vehicle is included in a region of low rotation speed and high load (non-EGR region), and thus the engine controller maintains the EGR valve in a fully closed state when starting the vehicle. In this case, the main fuel injection amount Qdrv which is supplied when starting the vehicle is constant. Further, under the conditions of low rotation speed and high load such as when starting the vehicle, the actual supercharging pressure is higher than the exhaust gas pressure upstream of the exhaust turbine. On the other hand, in the engine 1 of the present embodiment, the engine controller 21 opens the EGR valve 12 in the non-EGR region including when starting the vehicle so as to supply fresh air downstream of the intake compressor 3b to the exhaust passage 10.

In both current engines and the engine of the present embodiment, the flow path switching valve 33 blocks the passage on the EGR cooler 31 side in the non-EGR region including when starting the vehicle. Thus, when the EGR valve 12 is opened in the non-EGR region including when starting the vehicle in the present embodiment, fresh air of the intake pipe 2c downstream of the throttle valve 5 passes through the EGR passage 11 and the bypass passage 32 and flows into an exhaust manifold 10a (refer to FIG. 2B). However, the present invention can also be applied to an engine which does not include the EGR cooler 31, the bypass passage 32, and the flow path switching valve 33. The following explanation assumes that the flow path switching valve 33 is constantly in a fully closed state.

For the exhaust gas temperature, an exhaust port outlet temperature of the #4 cylinder and the inlet temperature of the exhaust turbine 3a are detected by temperature sensors. Herein, as also shown in FIGS. 2A and 2B, the exhaust passage 10 is constituted by the exhaust manifold 10a, an exhaust pipe 10b that establishes communication between a collection part of the exhaust manifold 10a and the inlet of the exhaust turbine 3a, an exhaust pipe 10c that establishes communication between the outlet of the exhaust turbine 3a and the inlet of the oxidation catalyst 14, and the like.

The temperature sensor that detects the exhaust port outlet temperature of the #4 cylinder is attached at the position marked A shown in FIGS. 2A and 2B. The temperature sensor that detects the inlet temperature of the exhaust turbine 3a is attached at the position marked B of the exhaust pipe 10b shown in FIGS. 2A and 2B.

The reason that the exhaust port outlet temperature of the #4 cylinder is detected rather than the exhaust port outlet temperatures of the #1 to #3 cylinders is as follows. The exhaust port outlet of the #4 cylinder is closest to the point at which fresh air of the intake pipe 2c downstream of the intercooler 4 flows into the collection part of the exhaust manifold 10a, and thus it can be continued based on the temperature at this point whether fresh air of the intake pipe 2c downstream of the intercooler 4 has flowed into the exhaust manifold 10a. The inlet temperature of the exhaust turbine 3a is utilized because it can be confirmed based on this temperature whether after-burning of unburned fuel in the exhaust gas which has exited into in the exhaust manifold 10a is occurring.

First, the case of current engines will be explained. In current engines, as shown by the third dashed line from the top in FIG. 3, the actual supercharging pressure does not reach the target supercharging pressure when starting the vehicle. Since the actual supercharging pressure is insufficient, the actual excess air ratio of the gas within the cylinders 41 is 1.05 which is near 1.0, and thus the actual excess air ratio does not reach the target excess air ratio of 1.2 (refer to the uppermost dashed line in FIG. 3). Accordingly, the actual engine torque when starting the vehicle does not reach the target engine torque (refer to the second dashed line from the top in FIG. 3).

In current engines, due to the influence of the actual excess air ratio of the gas within the cylinders 41, which is close to 1.0, and the insufficient actual supercharging pressure, the exhaust port outlet temperature of the #4 cylinder and the inlet temperature of the exhaust turbine 3a when starting the vehicle are 670° C. and 700° C. respectively, and thus the temperature difference is 30° C. Although small, this level of temperature difference indicates that afterburning of the unburned fuel in the exhaust gas that has exited into the exhaust manifold 10a is occurring to a small degree.

In the engine 1 equipped with the turbo charger 3, when the accelerator pedal has been depressed by a fixed amount so as to start the vehicle, due to the changes in the operation conditions when starting the vehicle, the rotation speed of the exhaust turbine 3a rises while the gas flow from an air cleaner 17 to the oxidation catalyst 14 changes. If the state in which accelerator pedal is depressed by a fixed amount continues, the rotation speed of the exhaust turbine 3a will eventually settle at a fixed value once the gas flow from the air cleaner 17 to the oxidation catalyst 14 stagnates. In other words, the movement of the turbo charger 3 enters a stable state. In FIG. 3, the state before t1 represents a state in which the gas flow has stagnated.

In this state in which the gas flow has stagnated, as shown by the third dashed line from the top in FIG. 3, the actual supercharging pressure settles at a fixed value that is lower than the target supercharging pressure, and the actual engine torque is established according to the actual supercharging pressure at this time as shown by the second dashed line from the top in FIG. 3. With this actual engine torque, the target engine torque cannot be achieved.

On the other hand, in the present embodiment, at the timing t1 at which the gas flow has stagnated, the opening degree of the EGR valve 12 is opened to a predetermined value TVO1, and fresh air downstream of the intercooler 4 flows into the exhaust manifold 10a as shown in FIG. 2B. Due to the fresh air that has flowed into the exhaust manifold 10a, in the present embodiment, the actual excess air ratio of the gas within the cylinders 41 and the actual excess air ratio of combustion gas within the exhaust manifold 10a differ from each other. In other words, in the present embodiment, the actual excess air ratio of the exhaust gas within the exhaust manifold 10a increases compared to that at t1 as shown by the first long dash-short dash line from the top in FIG. 3, and matches the target excess air ratio of 1.2 at the timing t3. Further, as shown by the third long dash-short dash line from the top in FIG. 3, the actual supercharging pressure rises from t1, and matches the target supercharging pressure at the timing t3. In addition, as shown by the second long dash-short dash line from the top in FIG. 3, the actual engine torque increases from t1 in accordance with the rise of the actual supercharging pressure, and matches the target engine torque at the timing t3. As described above, the desired acceleration feeling when starting the vehicle cannot be achieved in current engines, but the desired acceleration feeling can be achieved in the engine 1 of the present embodiment.

Below, the reason why the supercharging pressure rises upon opening the EGR valve 12 in the non-EGR region including when starting the vehicle will be explained. By opening the EGR valve 12, the exhaust port outlet temperature of the #4 cylinder decreases from 670° C. to 580° C., and the inlet temperature of the exhaust turbine 3a decreases from 700° C. to 670° C. In this way, the temperature difference between the two expands from 30° C. before opening the EGR valve 12 to 90° C. The reason that the exhaust port outlet temperature of the #4 cylinder decreases from 670° C. to 580° C. is because fresh air of the intake pipe 2c downstream of the intercooler 4 has flowed via the EGR passage 11 into the exhaust manifold 10a at a position closest to the exhaust port outlet of the #4 cylinder. Due to the fresh air flowing into the exhaust manifold 10a, even if the actual excess air ratio of gas within the cylinders 41 is 1.05, the actual excess air ratio of combustion gas within the exhaust manifold 10a increases to reach the target excess air ratio of 1.2. Thus, the temperature of exhaust gas increases by 90° C. while flowing from the exhaust port outlet of the #4 cylinder to the exhaust turbine 3a. The reason for this is because the fresh air which has flowed into the exhaust manifold 10a near the outlet of the exhaust port of the #4 cylinder causes after-burning (recombustion) of the unburned fuel in the exhaust gas that has exited from the cylinders 41 to the exhaust manifold 10a, and thereby the temperature of the exhaust gas rises.

When the temperature of exhaust gas upstream of the exhaust turbine 3a rises due to the after-burning caused by the introduction of fresh air into the exhaust manifold 10a, the pressure of the exhaust gas upstream of the exhaust turbine 3a also rises. If the temperature and pressure rise, volumetric expansion of the after-burned fresh air also occurs, and thus the exhaust gas energy increases. The exhaust gas energy increases beyond that of the exhaust gas before the rise in temperature and pressure. This increase in the energy of the exhaust gas upstream of the exhaust turbine 3a causes the rotation speed of the exhaust turbine 3a to increase, and the actual supercharging pressure increases due to an increase in the rotation speed of the intake compressor 3b which is coaxial with the exhaust turbine 3a. Basically, the state in which the gas flow has stagnated is temporarily lifted due to the fresh air flowing into the exhaust manifold 10a and the gas flow is reactivated, and thereby the turbo charger 3 operates and the actual supercharging pressure increases.

Next, in the non-EGR region, the engine controller 21 (EGR valve control function) originally placed the EGR valve 12 in a fully closed state. However, in the present embodiment, the engine controller 21 opens the EGR valve 12 in the non-EGR region. Therefore, in order to avoid interference with the EGR valve control function, in the present embodiment, the engine controller 21 performs control so as to open the EGR valve 12 preferentially over the EGR valve control function.

Figure 4:
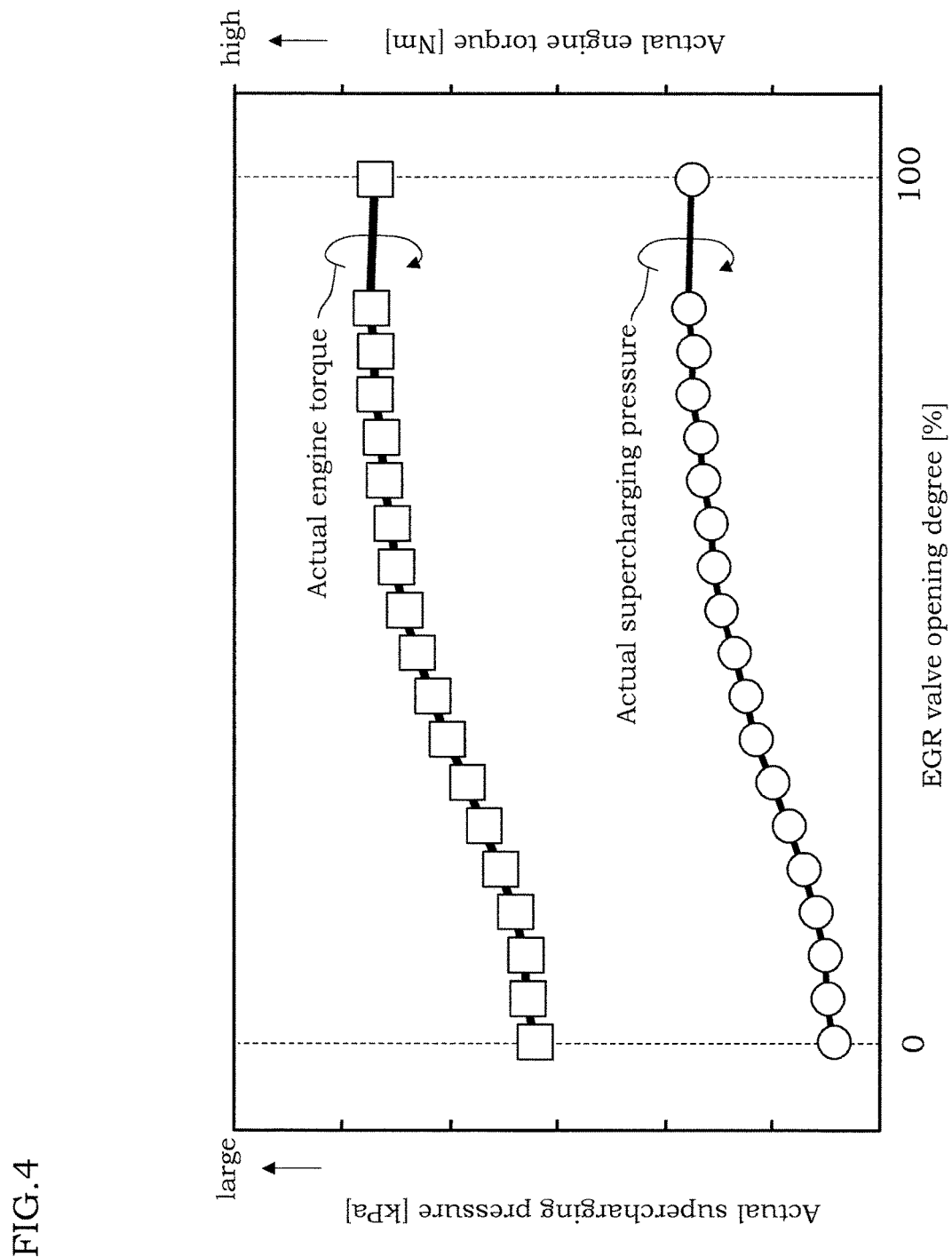
FIG. 4 is a characteristics graph of the actual supercharging pressure and the actual engine torque relative to the EGR opening degree.

In FIG. 4, it is verified how the actual supercharging pressure and the actual engine torque change when the EGR opening degree is changed from 0% to 100% under the same conditions when starting the vehicle as shown in FIG. 3. Referring to FIG. 4, it can be understood that the actual supercharging pressure rises as the EGR opening degree is increased, and that the actual engine torque rises in accordance with the rise of the actual supercharging pressure.

Figure 5:
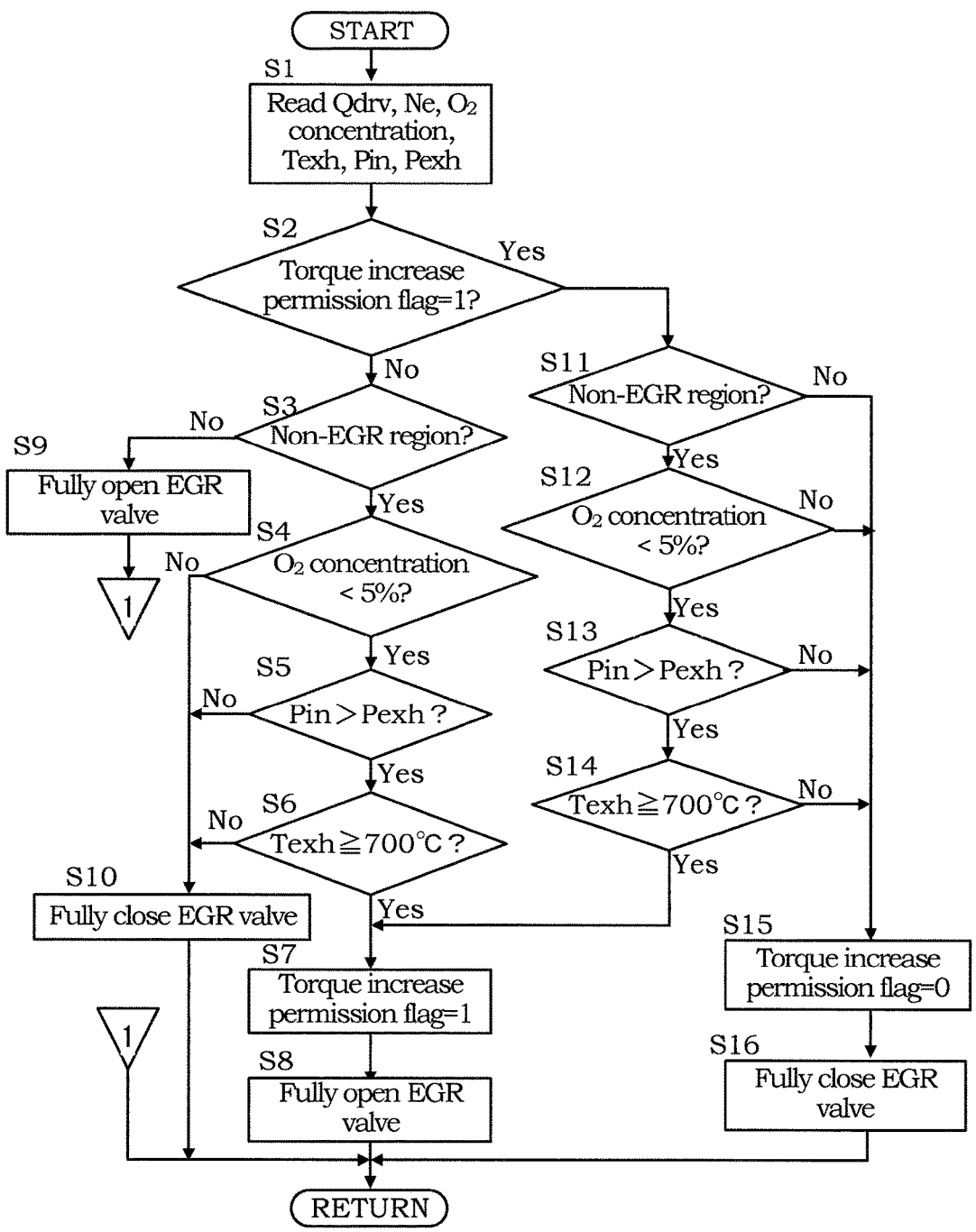
FIG. 5 is a flowchart for explaining the opening/closing control of the EGR valve in the first embodiment.

Below, the above-described control executed by the engine controller 21 will be explained referring to the flowchart in FIG. 5. FIG. 5 is a flowchart for explaining the opening/closing control of the EGR valve 12. This control is executed at fixed time intervals (for example, every 10 ms).

Figure 6:
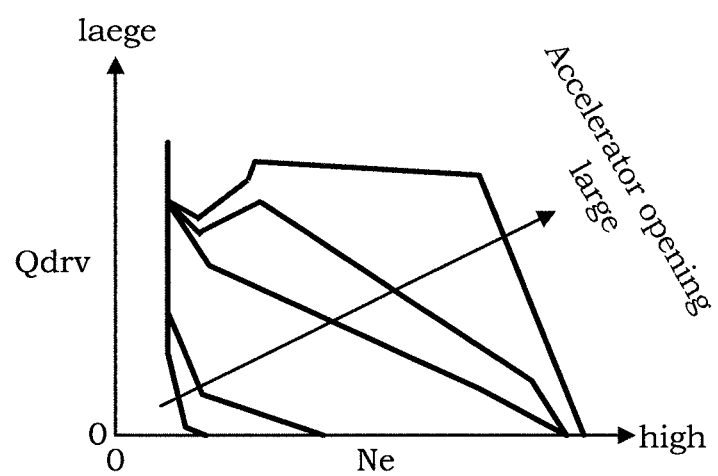
FIG. 6 is a characteristics graph of the main fuel injection amount in the first embodiment.

In Step 1, the engine controller 21 reads the main fuel injection amount Qdrv (amount corresponding to engine load), the engine rotation speed Ne, a supercharging pressure Pin, an exhaust gas pressure Pexh upstream of the exhaust turbine 3a, an $O_2$ concentration of the exhaust pipe 10b upstream of the exhaust turbine 3a, and an exhaust gas temperature Texh upstream of the exhaust turbine 3a. Herein, the main fuel injection amount Qdrv is calculated based on the accelerator opening and the engine rotation speed Ne. For example, as shown in FIG. 6, a map of the main fuel injection amount is prepared in advance using the accelerator opening and the engine rotation speed Ne as parameters, and this map is searched to calculate the main fuel injection amount Qdrv. The engine rotation speed Ne is calculated based on a signal from the crank angle sensor 23.

The supercharging pressure Pin, which is the intake air pressure downstream of the intercooler 4, is detected by an intake air pressure sensor 51 provided to the intake air collector 6 downstream of the intercooler 4. The position at which the intake air pressure sensor 51 is provided is not limited to the intake air collector 6, and can be anywhere as long as it is downstream of the intake compressor 3b. The exhaust gas pressure Pexh upstream of the exhaust turbine 3a is detected by an exhaust gas pressure sensor 52 provided to the exhaust manifold 10a. The position at which the exhaust gas pressure sensor 52 is provided is not limited to the exhaust manifold 10a, and can be anywhere as long as it is upstream of the exhaust turbine 3a. The $O_2$ concentration of the exhaust passage 10 upstream of the exhaust turbine 3a is detected by an $O_2$ concentration sensor 53 provided to the exhaust pipe 10b upstream of the exhaust turbine 3a. The position at which the $O_2$ concentration sensor 53 is provided can be anywhere as long as it is between the outlet of the exhaust manifold 10a and the inlet of the oxidation catalyst 14. The exhaust gas temperature Texh upstream of the exhaust turbine 3a is detected by an exhaust gas temperature sensor 54 provided to the exhaust pipe 10b upstream of the exhaust turbine 3a. The position at which the exhaust gas temperature sensor 54 is provided is not limited to the exhaust pipe 10b, and can be anywhere as long as it is upstream of the exhaust turbine 3a.

The supercharging pressure Pin, the exhaust gas pressure Pexh, the $O_2$ concentration in the exhaust gas, and the exhaust gas temperature Texh are detected by sensors, but these values can also be estimated using various parameters related to the engine operation conditions.

In Step 2, the engine controller 21 checks a torque increase permission flag. The torque increase permission flag is initially set to 0 during engine startup.

If the torque increase permission flag is 0, in Step 3, the engine controller 21 determines whether the engine operation conditions, which are determined from the Qdrv and the Ne, are in the non-EGR region.

As shown in FIG. 7, the EGR region is predetermined on a map using the engine rotation speed Ne and the main fuel injection amount Qdrv as parameters. In the EGR region, the combustion speed of gas within the cylinders 41 is relatively slow due to the introduction of a portion of the exhaust gas into the intake air collector 6, and thereby NOx, which is produced when the combustion speed is relatively high, is suppressed. Therein, in order to introduce a portion of the exhaust gas into the intake air collector 6, the exhaust gas pressure upstream of the exhaust turbine 3a must be higher than the supercharging pressure. In other words, in the EGR region, since the exhaust gas pressure upstream of the exhaust turbine 3a is higher than the supercharging pressure, fresh air of the intake pipe 2c downstream of the intercooler 4 cannot be made to flow into the exhaust manifold 10a. Conversely, in the non-EGR region, the exhaust gas pressure upstream of the exhaust turbine 3a becomes lower than the supercharging pressure, and thus fresh air of the intake pipe 2c downstream of the intercooler 4 can be made to flow into the exhaust manifold 10a. In the non-EGR region, such as when starting the vehicle, the engine controller 21 opens the EGR valve 12, and thereby a portion of the fresh air of the intake pipe 2c downstream of the intercooler 4 is made to flow into the exhaust manifold 10a. Thus, it is necessary to determine whether the vehicle is starting based on whether the engine operation conditions are in the non-EGR region. When it is deter mined that the engine operation conditions are in the EGR region, the engine controller 21 controls the EGR valve 12 to be fully opened in Step 9.

When the engine operation conditions are in the non-EGR region, the engine controller 21 executes the process of Step 4. Steps 4 to 6 are processes for determining whether the engine operation conditions are in the gas flow stagnation region. In Steps 4 to 6, the engine controller 21 observes whether the following conditions <1> to <3> are satisfied, and when all of the conditions are satisfied, it is determined that the engine operation conditions are in the gas flow stagnation region. If the operation conditions are in the gas flow stagnation region, the engine controller 21 sets the torque increase permission flag to 1 in Step 7 and controls the EGR valve 12 to be fully opened in Step 8 in order to permit the engine torque to increase.

<1> The $O_2$ concentration in the exhaust gas upstream of the oxidation catalyst 14 in the non-EGR region is less than 5%.

<2> The supercharging pressure Pin is higher than the exhaust gas pressure Pexh upstream of the exhaust turbine 3a.

<3> The exhaust gas temperature Texh upstream of the exhaust turbine 3a is 700° C. or greater.

The reason why <1> is a condition is as follows. If the $O_2$ concentration in the exhaust gas upstream of the oxidation catalyst 14 in the non-EGR region becomes an $O_2$ concentration of less than 5%, even if the fuel amount is further increased, the combustion of fuel in the gas within the cylinders 41 becomes poor due to insufficient oxygen in the gas within the cylinders 41, and the gas flow entering the exhaust turbine 3a stagnates and the turbine rotation speed becomes fixed. If the turbine rotation speed becomes fixed, the intake compressor 3b which is coaxial with the exhaust turbine 3a cannot compress the intake air any further, and thus the actual supercharging pressure also settles at a fixed value. If the actual supercharging pressure settles at a fixed value, the actual engine torque cannot increase any further. 5% is an upper limit value within the $O_2$ concentration range at which the actual engine torque will not increase any further even if the amount of fuel is further increased. Conversely, in an $O_2$ concentration range in which the $O_2$ concentration in the exhaust gas upstream of the oxidation catalyst 14 in the non-EGR region is 5% or more, the oxygen in the gas within the cylinders 41 does not become insufficient. If the fuel amount is increased in a state in which the oxygen in the gas within the cylinders 41 does not become insufficient, the fuel in the gas within the cylinders 41 combusts satisfactorily and the engine torque increases.

Thus, it is not necessary to purposely open the EGR valve 12 to allow fresh air to flow in.

In the condition <1>, it is determined whether the engine torque will not increase any further even if the fuel amount is increased on the basis of the $O_2$ concentration in the exhaust gas upstream of the oxidation catalyst 14 in the non-EGR region, but the present embodiment is not limited thereto. It can also be determined whether the engine torque will not increase any further even if the fuel amount is increased on the basis of the excess air ratio of gas within the cylinders 41 in the non-EGR region. For example, a 5% $O_2$ concentration in the exhaust gas upstream of the oxidation catalyst 14 in the non-EGR region is a value corresponding to an excess air ratio of gas within the cylinders 41 in the non-EGR region of 1.05. Thus, using 1.05 as a threshold, the actual excess air ratio of gas within the cylinders 41 in the non-EGR region is compared to the threshold of 1.05. When the actual excess air ratio of gas within the cylinders 41 in the non-EGR region is less than 1.05, it can be determined that the engine torque will not increase any further even if the fuel amount is increased. Therein, the actual excess air ratio λreal of gas within the cylinders 41 in the non-EGR region is calculated by the following equation.

$$\lambda real = Qa/Qdrv/14.5 \qquad (1)$$

Qa: intake air amount detected by an air flowmeter 55
Qdrv: main fuel injection amount The fuel used in the diesel engine 1 is an aggregate of hydrocarbons which can take various values for the numbers of C (carbon) and H (hydrogen). Therefore, even if the actual excess air ratio λreal calculated by the equation in (1) above is the same at 1.0, the $O_2$ concentration in the gas within the cylinders 41 may differ depending on the fuel used. When the calculated actual excess air ratio is 1.0, the actual $O_2$ concentration was about 2% upon detecting the $O_2$ concentration in the fuel used in experimentation. In this way, in commercially available fuels, the actual excess air ratio as calculated by the equation in (1) above and the actual $O_2$ concentration detected by an $O_2$ concentration sensor do not necessarily correspond accurately, and may vary within a certain allowable range. In other words, the $O_2$ concentration of 5% discussed above is merely given as a representative value, and the $O_2$ concentration is actually set to an appropriate value between 0% and 5%. Further, the excess air ratio of 1.05 discussed above as a threshold is also merely given as a representative value, and an appropriate value between 1.0 and 1.1 is actually selected as the threshold. In the present embodiment, with a focus on the $O_2$ concentration that is actually detected, it is determined whether the engine operation conditions are in the gas flow stagnation region in which the engine torque will not increase any further even if the fuel amount is increased on the basis of the detected $O_2$ concentration.

The reason why <2> is a condition is as follows. If the supercharging pressure Pin is equal to or less than the exhaust gas pressure Pexh upstream of the exhaust turbine 3a, fresh air of the intake pipe 2c downstream of the intercooler 4 cannot flow into the exhaust manifold 10a via the EGR passage 11 and the bypass passage 32. The condition in <2> establishes a condition in which fresh air of the intake pipe 2c downstream of the intercooler 4 can flow into the exhaust manifold 10a.

The reason why <3> is a condition is as follows. In order to after-burn the unburned fuel in the exhaust gas that has exited from the cylinders 41 to the exhaust manifold 10a using fresh air introduced into the exhaust manifold 10a, it is favorable for the ambient temperature of the gas to be after-burned to be relatively high. After-burning can occur satisfactorily in a temperature range of 700° C. or higher. The condition in <3> is a temperature condition at which after-burning of the unburned fuel in the exhaust gas that has exited from the cylinders 41 to the exhaust manifold 10a will reliably occur. After-burning can still occur even if the ambient temperature of the gas to be after-burned is relatively low at less than 700°, and thus Step 6 can be eliminated.

When all of the conditions in <1> to <3> have been satisfied, the engine controller 21 determines that the engine operation conditions are in the gas flow stagnation region, and thus executes the process of Step 8.

Step 8 is a process in which the engine controller 21 executes control of the EGR valve 12 preferentially. When this process is executed, since the engine operation conditions are in the non-EGR region, the EGR valve 12 should be controlled to be fully closed according to the EGR valve control function, but instead the EGR valve 12 is controlled to be fully opened in Step 8. Herein, "preferentially" means that the EGR valve 12 is controlled to be fully opened without performing control to fully close the EGR valve 12 according to the EGR valve control function. When the EGR valve 12 is opened, fresh air downstream of the intercooler 4 is supplied to the exhaust manifold 10a via the EGR passage 11 and the bypass passage 32 as shown in FIG. 2B. Since fresh air of the intake pipe 2c downstream of the intercooler 4 is supplied to the exhaust manifold 10a without passing through the cylinders 41, the unburned fuel in the exhaust gas that has exited from the cylinders 41 to the exhaust manifold 10a is after-burned using the fresh air. Thereby, the temperature and pressure of exhaust gas flowing into the exhaust turbine 3a can be increased compared to the case in which fresh air is not introduced into the exhaust manifold 10a. If the temperature and pressure of exhaust gas flowing into the exhaust turbine 4a rise, volumetric expansion of the after-burned fresh air also occurs, and thus the work load of the exhaust turbine 3a increases. Therefore, the rotation speed of the intake compressor 3b which is coaxial with the exhaust turbine 3a rises, and the actual supercharging pressure also rises accordingly. If the supercharging pressure rises, the amount of fresh air flowing into the cylinders 41 increases, and thus the combustion state of the fuel in the gas within the cylinders 41 improves and the actual engine torque increases.

The EGR valve opening degree when opening the EGR valve 12 in Step 8 is adjusted to a pre-set appropriate opening degree. In the control flow (not illustrated) executed by the engine controller 21, the target supercharging pressure is determined according to the engine operation conditions. The opening degree (opening ratio) of the variable nozzle 3c is feedback controlled so that the actual supercharging pressure Pin when starting the vehicle, which is detected by the intake air pressure sensor 51, matches the target supercharging pressure. However, in the gas flow stagnation region such as when starting the vehicle, the target supercharging pressure cannot be obtained (refer to the third in FIG. 3). Thus, the EGR valve opening degree when the EGR valve 12 is opened is set so that the actual supercharging pressure can reach the target supercharging pressure when recombustion of the unburned fuel in the exhaust gas has been carried out by opening the EGR valve 12 so that the gas flow stagnation is temporarily lifted and the actual supercharging pressure has increased.

Alternatively, the amount of fresh air or the amount of fuel can be feedback controlled so that the actual excess air ratio of gas within the cylinders 41 matches the target excess air ratio. However, in the gas flow stagnation region such as when starting the vehicle, the target excess air ratio cannot be obtained (refer to the first in FIG. 3). Thus, if the EGR valve 12 is opened, the actual excess air ratio of the exhaust gas within the exhaust manifold 10a changes to become greater than the actual excess air ratio of gas within the cylinders 41. Thus, recombustion of the unburned fuel in the exhaust gas occurs, and the gas flow stagnation is temporarily lifted and the actual supercharging pressure increases. At this time, the EGR valve opening degree is set so that the actual excess air ratio of the exhaust gas within the exhaust manifold 10a which has changed matches the target air excess ratio.

If one of the conditions in <1> to <3> is not satisfied, the engine controller 21 determines that the engine operation conditions are not in the gas flow stagnation region, and the EGR valve 12 is controlled to be in a fully closed state in Step 10.

When the torque increase permission flag is 1, the engine controller 21 executes the process of Step 11 after executing Step 2. Steps 11 to 14 are processes for establishing the conditions for cancelling the permission for torque increase after the engine torque increase has been permitted. In Steps 11 to 14, the engine controller 21 determines whether the following conditions <11> to <14> are satisfied. If one of the conditions is satisfied, then it is determined that the conditions for cancelling the permission for torque increase have been met. When the cancellation conditions have been met, the engine controller 21 returns the torque increase permission flag to 0 in Step 15, and controls the EGR valve 12 to a fully closed state in Step 16.

<11> The engine operation conditions are in the EGR region.

<12> The concentration of oxygen included in the exhaust gas upstream of the oxidation catalyst 14 in the non-EGR region is 5% or more.

<13> The supercharging pressure Pin is equal to or lower than the exhaust gas pressure Pexh upstream of the exhaust turbine 3a.

<14> The exhaust gas temperature Texh upstream of the exhaust turbine 3a is less than 700° C.

When none of the conditions in <11> to <14> is satisfied, the engine controller 21 determines that the conditions for cancelling the permission for torque increase have not been met, and executes the processes of Steps 7 and 8. It was mentioned above that Step 6 may be eliminated, and when Step 6 is eliminated, Step 14 may also be eliminated.

In the present embodiment, when the conditions for cancelling the permission for torque increase have been met after the engine torque increase has been permitted, the EGR valve 12 is fully closed. However, the present embodiment is not limited thereto. For example, the EGR valve 12 can be controlled to a fully closed state when a certain predetermined duration of time has elapsed from the timing at which the engine torque increase was permitted. The fixed duration of time is set as a time during which the driver desires an acceleration feeling when starting the vehicle. Alternatively, the EGR valve 12 can be controlled to a fully closed state when either the conditions for cancelling the permission for torque increase have been met or the fixed duration of time has passed from the timing at which the engine torque increase was permitted.

In the following, the operational effects of the present embodiment will be explained.

The engine 1 of the present embodiment includes the turbo charger 3, the fresh air/secondary air supply device consisting of the EGR passage 11 and the EGR valve 12, and the engine controller 21. The turbo charger 3 coaxially joins the intake compressor 3b and the exhaust turbine 3a, and drives the intake compressor 3b with energy of exhaust gas which flows into the exhaust turbine 3a to pressurize intake air which flows into the intake compressor 3b. The fresh air/secondary air supply device 11,12 is constituted to be capable of supplying fresh air to the exhaust manifold 10a. The engine controller 21 determines whether the engine operation conditions are in a gas flow stagnation region, and when the engine operation conditions are in the gas flow stagnation region, the engine controller 21 causes the fresh air/secondary air supply device 11,12 to operate and supply fresh air to the exhaust manifold 10a.

According to the present embodiment, when the operation conditions of the engine 1 are in the gas flow stagnation region, by supplying fresh air to the exhaust manifold 10a, the actual supercharging pressure rises compared to before supplying the fresh air. If the actual supercharging pressure rises, the actual engine torque can be increased by the amount of rise of the actual supercharging pressure. Thereby, a desired acceleration feeling can be obtained even in the gas flow stagnation region such as when starting the vehicle.

In the present embodiment, the fresh air/secondary air supply device 11,12 constitutes a portion of the EGR control device. The EGR control device includes the EGR passage 11, the normally-closed EGR valve 12, and the engine controller 21. The EGR passage 11 recirculates a portion of the exhaust gas to the intake passage 2. The EGR valve 12 opens/closes the EGR passage 11. The engine controller 21 determines whether the engine operation conditions are in the EGR region or in the non-EGR region which includes the gas flow stagnation region. The engine controller 21 opens the EGR valve 12 when the engine operation conditions are in the EGR region, and closes the EGR valve 12 when the engine operation conditions are in the non-EGR region. Further, the engine controller 21 opens the EGR valve 12 when the engine operation conditions are in the gas flow stagnation region, so as to supply fresh air downstream of the intercooler 4 to the exhaust manifold 10a. In this case, the engine controller 21 gives preference to control for fully opening the EGR valve 12 when the engine operation conditions are in the gas flow stagnation region over control for fully closing the EGR valve 12 according to the EGR valve control function.

According to the present embodiment, since fresh air is supplied to the exhaust manifold 10a using the EGR control device 11,12,21, if the EGR control device 11,12,21 already exists in the engine 1, then cost increases can be avoided.

The engine 1 of the present embodiment includes the $O_2$ concentration sensor 53, and the engine controller 21 which compares the intake air pressure Pin downstream of the intake compressor 3b with the exhaust gas pressure Pexh upstream of the exhaust turbine 3a. If the $O_2$ concentration in the exhaust gas is at least zero and the intake air pressure Pin downstream of the intake compressor 3b is higher than the exhaust gas pressure Pexh upstream of the exhaust turbine 3a, the engine controller 21 determines that the engine operation conditions are in the gas flow stagnation region. Alternatively, if the excess air ratio of gas within the cylinders is at least 1.0 and the intake air pressure downstream of the intake compressor 3b is higher than the exhaust gas pressure upstream of the exhaust turbine 3a, the engine controller 21 determines that the engine operation conditions are in the gas flow stagnation region. Thereby, it can be determined with good accuracy whether the engine operation conditions are in the gas flow stagnation region on the basis of the engine operation conditions ($O_2$ concentration in the exhaust gas, excess air ratio of gas within the cylinders, intake air pressure Pin, exhaust gas pressure Pexh).

In the present embodiment, if the exhaust gas temperature upstream of the exhaust turbine 3a is higher than 700° C., which is the temperature at which after-burning of unburned fuel in the exhaust gas reliably occurs, the engine controller 21 determines that the engine operation conditions are in the gas flow stagnation region. Thereby, after-burning of unburned fuel in the exhaust gas that has exited from the cylinders 41 to the exhaust manifold 10a can be reliably achieved.

In the present embodiment, the gas flow stagnation region includes when starting the vehicle. Thereby, a desired acceleration feeling can be obtained when starting the vehicle.

In the present embodiment, the turbo charger 3 has the variable nozzle 3c. Further, the engine controller 21 sets a target supercharging pressure according to the engine operation conditions, and feedback controls the opening degree of the variable nozzle 3c so that the actual supercharging pressure matches the target supercharging pressure. When the EGR valve 12 is opened, the engine controller 21 sets the EGR valve opening degree when the EGR valve 12 is opened so that the actual supercharging pressure matches the target supercharging pressure. Thereby, a desired supercharging pressure (target supercharging pressure) can be obtained even in a low-rotation-speed high-load region such as when starting the vehicle.

Second Embodiment

Figure 8A:
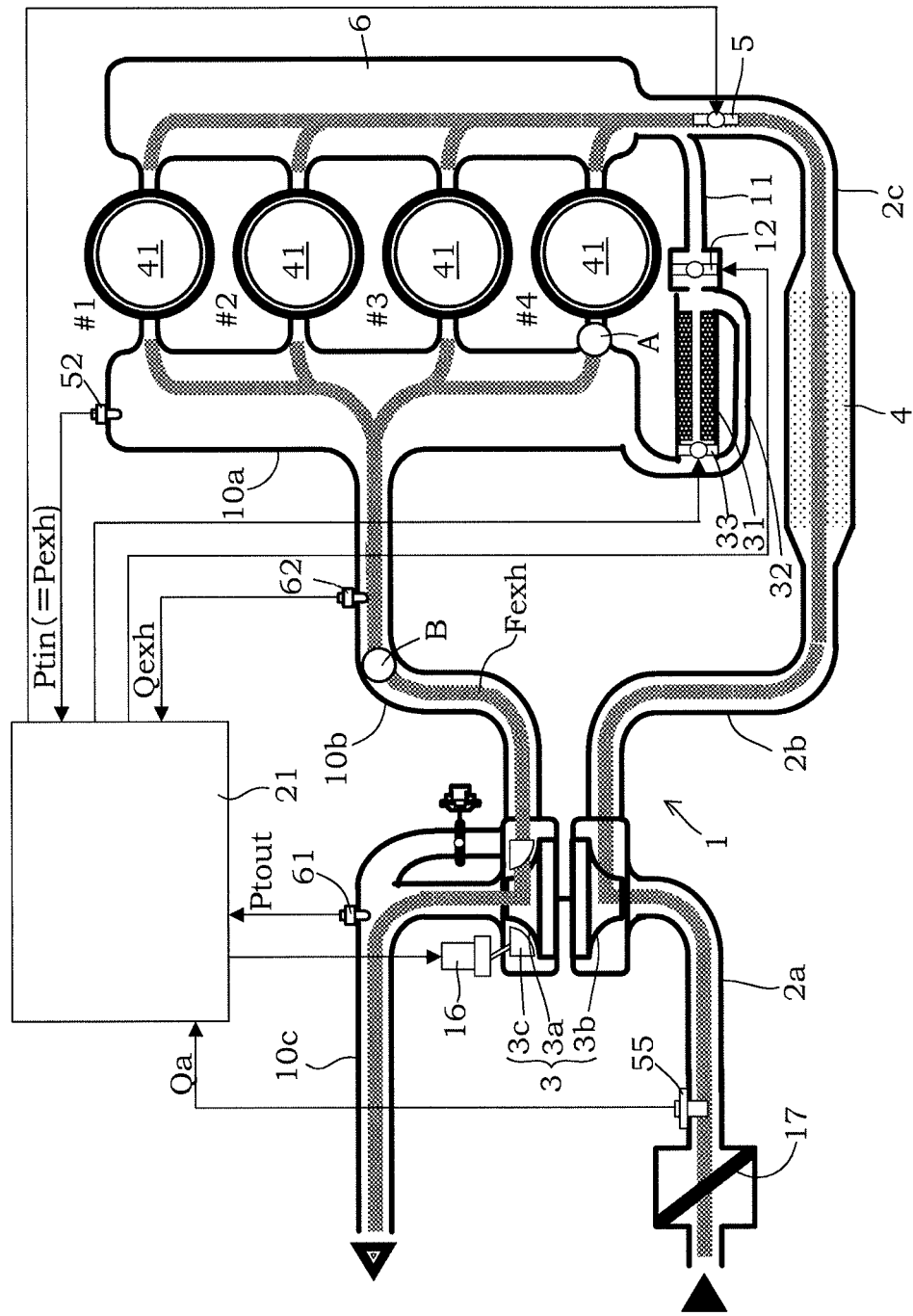
FIG. 8A is a schematic constitutional view illustrating the essential parts of the engine and a close-up of a turbo charger of a second embodiment.
Figure 8B:
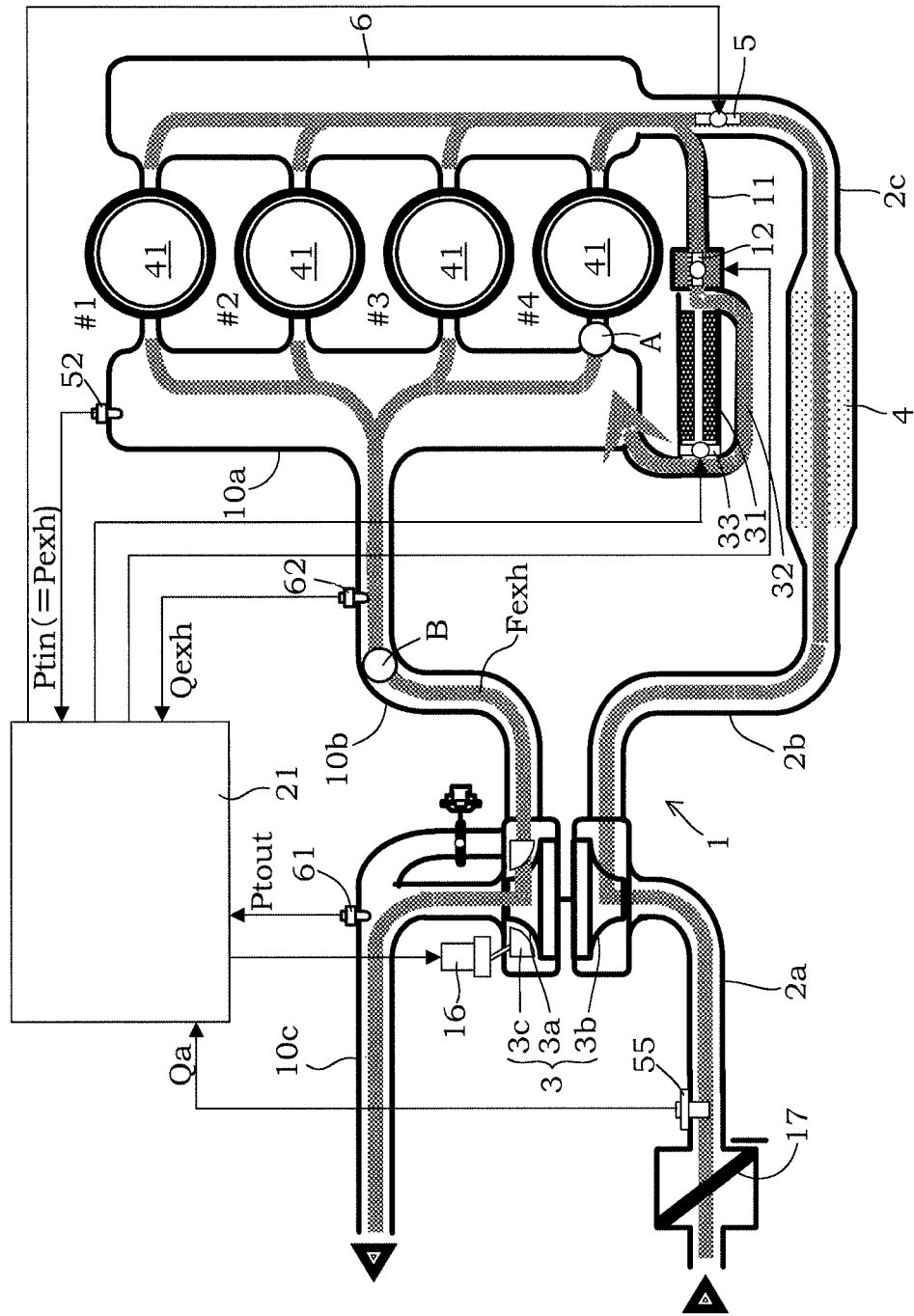
FIG. 8B is a schematic constitutional view illustrating the essential parts of the engine and a close-up of the turbo charger of the second embodiment.

FIGS. 8A and 8B are schematic constitutional views illustrating the essential parts of the engine 1 and a close-up of the turbo charger 3 in a second embodiment. FIG. 8A illustrates a state before opening the EGR valve 12 when the state of the turbo charger 3 is in a gas flow stagnation region, and FIG. 8B illustrates a state after opening the EGR valve 12 when the state of the turbo charger 3 is in the gas flow stagnation region. Those portions which are identical to FIGS. 2A and 2B of the first embodiment will be assigned identical reference numerals.

In the first embodiment, the engine controller 21 determined whether the engine operation conditions are in the gas flow stagnation region based on whether all of the conditions in <1> to <3> are satisfied. In the second embodiment, the engine controller 21 determines whether the state of the turbo charger 3 is in the gas flow stagnation region based on whether an operation point of the exhaust turbine 3a is in a gas flow stagnation region, which has been preset on a turbine performance curve (exhaust turbine performance curve characteristics). More specifically, in the first embodiment, it was determined whether the engine operation conditions are in the gas flow stagnation region, whereas in the second embodiment, it is determined whether the state of the turbo charger 3 is in the gas flow stagnation region.

Figure 10:
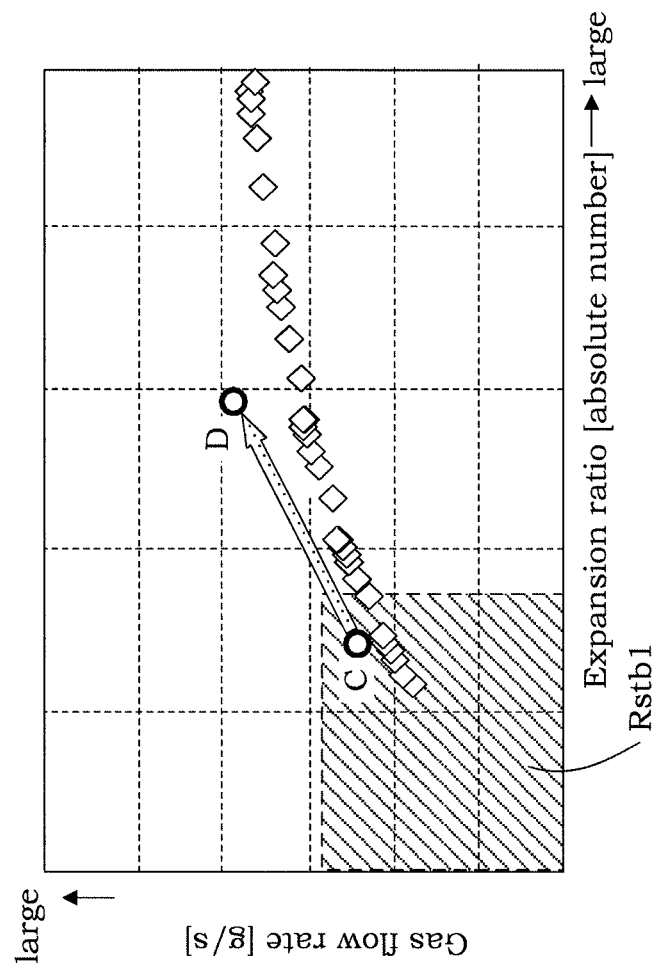
FIG. 10 is a turbine performance curve of the second embodiment.

The operation point of the exhaust turbine 3a is an operation point of the exhaust turbine 3a determined from an expansion ratio and a gas flow rate in the turbine performance curve shown in FIG. 10. In order to know the operation point of the exhaust turbine 3a, it is necessary to find the expansion ratio of the exhaust turbine 3a and the gas flow rate Qexh of gas flowing through the exhaust turbine 3a. The expansion ratio of the exhaust turbine 3a is the ratio of an inlet pressure Ptin of the exhaust turbine 3a and an outlet pressure Ptout of the exhaust turbine 3a, and is calculated by the following equation.

$$\text{Expansion Ratio} = P\text{tin}/P\text{tout} \tag{2}$$

Herein, the inlet pressure Ptin of the exhaust turbine 3a is detected by an exhaust gas pressure sensor 52 provided in the exhaust manifold 10a as shown in FIGS. 8A and 8B. The outlet pressure Ptout of the exhaust turbine 3a is detected by an outlet pressure sensor 61 provided in the exhaust pipe 10c as shown in FIGS. 8A and 8B. The gas flow rate Qexh of gas flowing through the exhaust turbine 3a is detected by a gas flow rate sensor 62 provided in the exhaust pipe 10b as shown in FIGS. 8A and 8B. The inlet pressure Ptin of the exhaust turbine 3a, the outlet pressure Ptout of the exhaust turbine 3a, and the gas flow rate Qexh detected by the above sensors 52, 61, and 62 are input into the engine controller 21.

Figure 9:
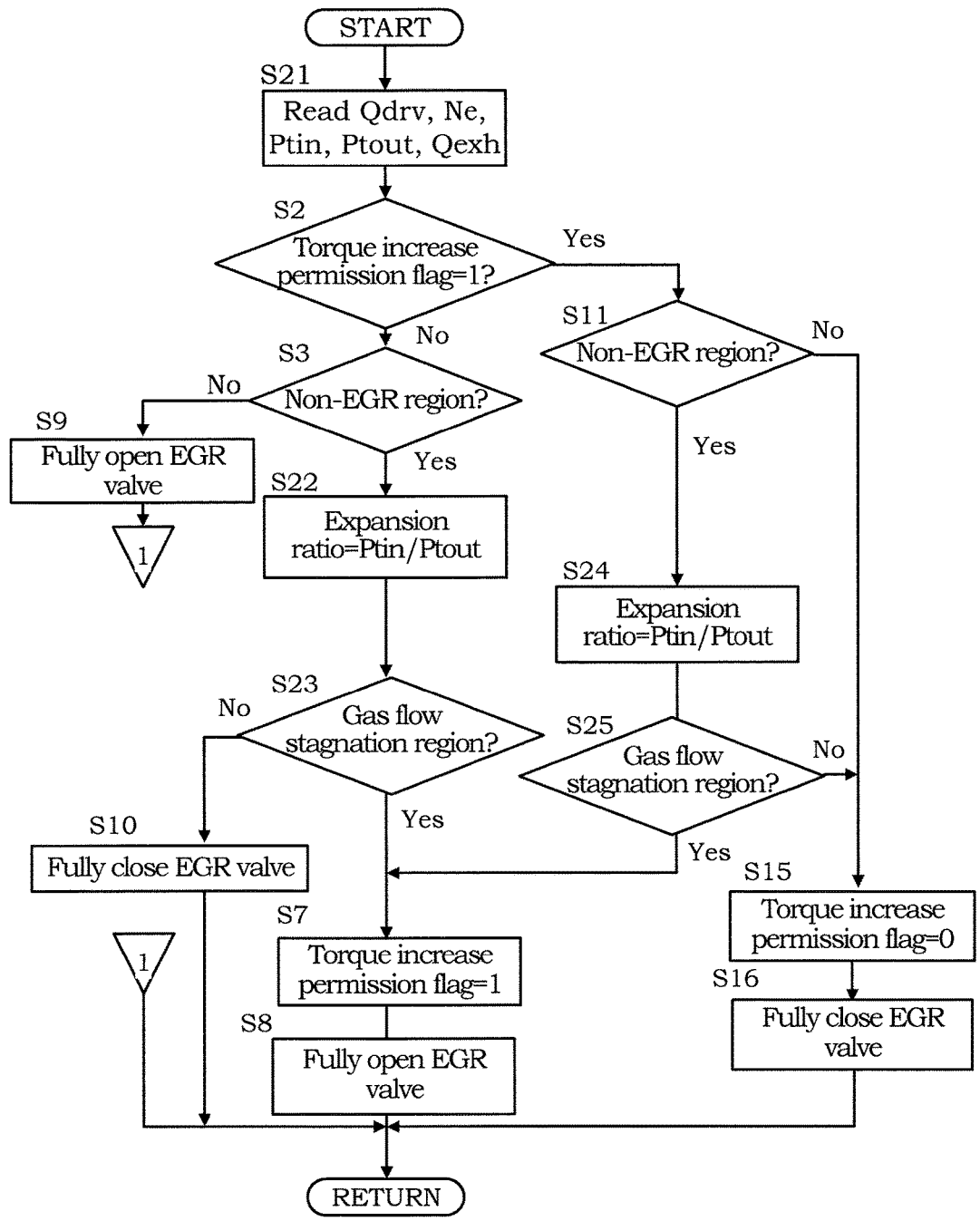
FIG. 9 is a flowchart for explaining the opening/closing control of an EGR valve in the second embodiment.

Referring to FIG. 9, the control executed by the engine controller 21 will now be explained. FIG. 9 is a flowchart for explaining the opening/closing control of the EGR valve 12. This control is executed at fixed time intervals (for example, every 10 ms). Processes which are identical to those in the flowchart of FIG. 5 for the first embodiment will be assigned the same reference numerals.

The processes which differ from those of the flowchart of FIG. 5 for the first embodiment are Steps 21 to 25. In relation to the first embodiment, Steps 4 to 6 of FIG. 5 of the first embodiment are replaced with Steps 22 and 23 of FIG. 9 of the present embodiment. Further, Steps 12 to 14 of FIG. 5 of the first embodiment are replaced with Steps 24 and 25 of FIG. 9 of the present embodiment.

As shown in FIG. 9, in Step 21, the engine controller 21 reads the main fuel injection amount Qdrv, the engine rotation speed Ne, the inlet pressure Ptin of the exhaust turbine 3a, the outlet pressure Ptout of the exhaust turbine 3a, and the gas flow rate Qexh of gas flowing through the exhaust turbine 3a. The inlet pressure Ptin of the exhaust turbine 3a is detected by the exhaust gas pressure sensor 52, the outlet pressure Ptout of the exhaust turbine 3a is detected by the outlet pressure sensor 61, and the gas flow rate Qexh [g/s] of gas flowing through the exhaust turbine 3a is detected by the gas flow rate sensor 62. The gas flow rate Qexh of gas flowing through the exhaust turbine 3a can be estimated using parameters indicating the engine operation state.

If it is determined in Step 3 that the engine operation conditions are in the non-EGR region, in Step 22, the engine controller 21 calculates the expansion ratio [dimensionless number] of the exhaust turbine 3a from the inlet pressure Ptin of the exhaust turbine 3a and the outlet pressure Ptout of the exhaust turbine 3a using the above-mentioned equation (2).

In Step 23, the engine controller 21 determines whether the operation point of the exhaust turbine 3a, which is determined from the expansion ratio of the exhaust turbine 3a and the gas flow rate of gas flowing through the exhaust turbine 3a, is in a gas flow stagnation region Rstb1 (refer to the hatched region) on the turbine performance curve shown in FIG. 10.

Herein, in the turbine performance curve, the expansion ratio [dimensionless number] of the exhaust turbine 3a is shown on the horizontal axis, and the gas flow rate [g/s] of gas flowing through the exhaust turbine 3a is shown on the vertical axis. The turbine performance curve shows how the operation point of the exhaust turbine 3a changes due to differences in the engine operation conditions. In the exhaust turbine 3a used in current engines and the engine 1 of the present embodiment, the position of the operation point of the exhaust turbine 3a moves, for example, as shown by the square marks in FIG. 10 due to changes in the engine operation conditions. In current engines, the operation point of the exhaust turbine 3a when starting the vehicle is at the position of point C, where both the expansion ratio and the gas flow rate are small. Therefore, the gas flow stagnation region Rstb1 is predetermined so as to include the operation point (point C) of the exhaust turbine 3a when starting the vehicle in current engines as well as the region on the side in which the expansion ratio and gas flow rate are smaller than those at the point C. In FIG. 10, the gas flow stagnation region Rstb1 is set so as to cover up to a region on the side in which the expansion ratio and gas flow rate are slightly larger than those at the point C. This is because fluctuations exist in the operation point of the exhaust turbine 3a when starting the vehicle, and thus the gas flow stagnation region Rstb1 is set in consideration of such fluctuations.

Returning to FIG. 9, when the operation point of the exhaust turbine 3a determined from the expansion ratio and the gas flow rate is not in the gas flow stagnation region Rstb1 shown in FIG. 10, in Step 10, the engine controller 21 controls the EGR valve 12 to a fully closed state.

On the other hand, if it is determined in Step 23 that the operation point of the exhaust turbine 3a determined from the expansion ratio and the gas flow rate is in the gas flow stagnation region Rstb1 shown in FIG. 10, the engine controller 21 determines that the state of the turbo charger 3 is in the gas flow stagnation region. At this time, the engine controller 21 proceeds to Steps 7 and 8 for permitting an increase in the engine torque, in which the engine controller 21 sets the torque increase permission flag to 1 and opens the EGR valve 12.

If it is determined in Step 2 that the torque increase permission flag is 1, the engine controller 21 executes the process of Step 11. If it is determined in Step 11 that the engine control conditions are in the non-EGR region, the engine controller 21 executes the process of Step 24, and calculates the expansion ratio of the exhaust turbine 3a in the same manner as in Step 22. In Step 25, the engine controller 21 determines whether the operation point of the exhaust turbine 3a determined from the expansion ratio and the gas flow rate is in the gas flow stagnation region Rstb1 shown in FIG. 10. If the operation point of the exhaust turbine 3a is in the gas flow stagnation region Rstb1, the engine controller 21 determines that the state of the turbo charger 3 continues to be in the gas flow stagnation region, and thus executes the processes of Steps 7 and 8.

When the EGR valve 12 is opened in Step 8, fresh air of the intake pipe 2c downstream of the intercooler 4 flows into an exhaust manifold 10a via the EGR passage 11 and the bypass passage 32 as shown in FIG. 8B. Unburned fuel in the exhaust gas that has exited from the cylinders 41 into the exhaust manifold 40a after-burns due to the fresh air, and the temperature and pressure of exhaust gas flowing into the exhaust turbine 3a rise. In other words, the inlet pressure (expansion ratio) of the exhaust turbine 3a increases and the gas flow rate of gas flowing through the exhaust turbine 3a increases compared to before the EGR valve 12 was opened. This means that the operation point of the exhaust turbine 3a when starting the vehicle moves to a point D in FIG. 10 at which the expansion ratio is higher than at the point C and the gas flow rate of gas flowing through the exhaust turbine 3a is higher than at the point C. At the point D, since the gas flow rate is higher than at the point C, the rotation speed of the exhaust turbine 3a increases accordingly, and the rotation speed of the intake compressor 3b which is coaxial with the exhaust turbine 3a also increases. As a result, the actual supercharging pressure rises to the target supercharging pressure, and the actual engine torque increases.

On the other hand, if it is determined in Step 25 that the turbine operation point is outside of the gas flow stagnation region Rstb1, the engine controller 21 sets the torque increase permission flag to 0 in Step 15, and controls the EGR valve 12 to a fully closed state in Step 16.

In the second embodiment, when the state of the turbo charger 3 deviates from the gas flow stagnation region Rstb1 after the increase in the engine torque has been permitted, the EGR valve 12 is fully closed. However, the present embodiment is not limited thereto. For example, the EGR valve 12 can be controlled to a fully closed state when a certain predetermined duration of time has elapsed from the timing at which the engine torque increase was permitted. The fixed duration of time is set as a time during which the driver desires an acceleration feeling when starting the vehicle. Alternatively, the EGR valve 12 can be controlled to a fully closed state when either the state of the turbo charger 3 has deviated from the gas flow stagnation region Rstb1 or the fixed duration of time has passed from the timing at which the engine torque increase was permitted.

In the second embodiment, the engine 1 includes the gas flow rate sensor 62 and the engine controller 21. The engine controller 21 calculates the expansion ratio, and stores a turbine performance curve (exhaust turbine performance curve characteristics) using the calculated expansion ratio and the gas flow rate as parameters. The engine controller 21 determines whether the state of the turbo charger 3 is in the gas flow stagnation region based on whether an operation point of the exhaust turbine 3a, which is determined from the calculated expansion ratio and the detected gas flow rate, is in a gas flow stagnation region, which has been preset on the turbine performance curve. Thereby, it can be determined whether the state of the turbo charger 3 is in the gas flow stagnation region without using an expensive sensor such as the $O_2$ concentration sensor 53, and without being based on the engine operation conditions.

In order to manage the operation of the turbo charger 3, the engine 1 has an exhaust turbine 3a monitoring device consisting of the sensors 52, 61, and 62 and the engine controller 21. Using the sensors 52, 61, and 62 and the engine controller 21, the exhaust turbine 3a monitoring device finds the expansion ratio and the gas flow rate and monitors where the operation point of the exhaust turbine 3a, which is determined from the expansion ratio and the gas flow rate, is located on the turbine performance curve shown in FIG. 10. Therefore, if the exhaust turbine 3a monitoring device already exists in the engine 1, then it can be determined whether the state of the turbo charger 3 is in the gas flow stagnation region by merely adding software (the flow of FIG. 9), and thus cost increases can be avoided.

Third Embodiment

Figure 11A:
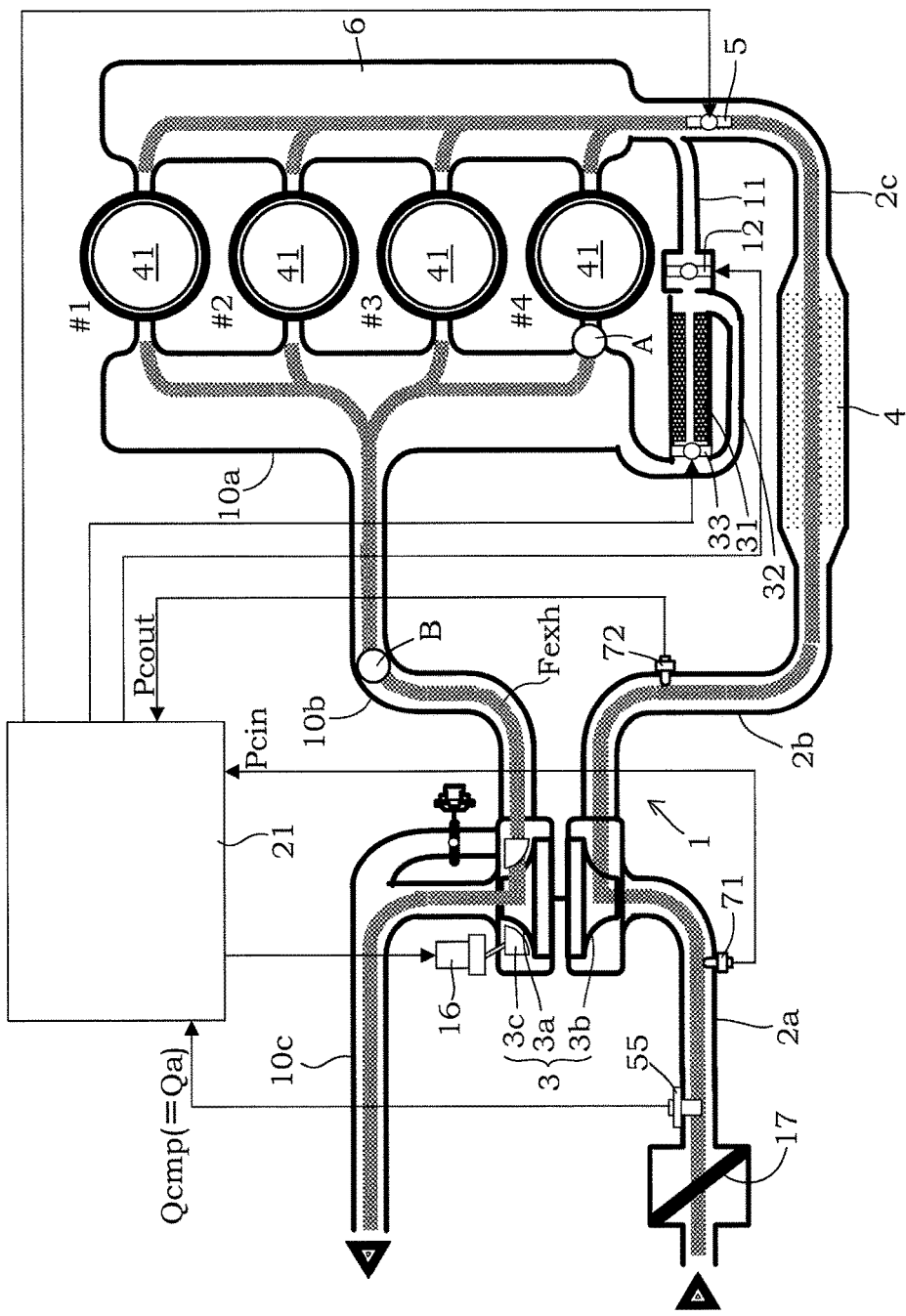
FIG. 11A is a schematic constitutional view illustrating the essential parts of the engine and a close-up of a turbo charger of a third embodiment.
Figure 11B:
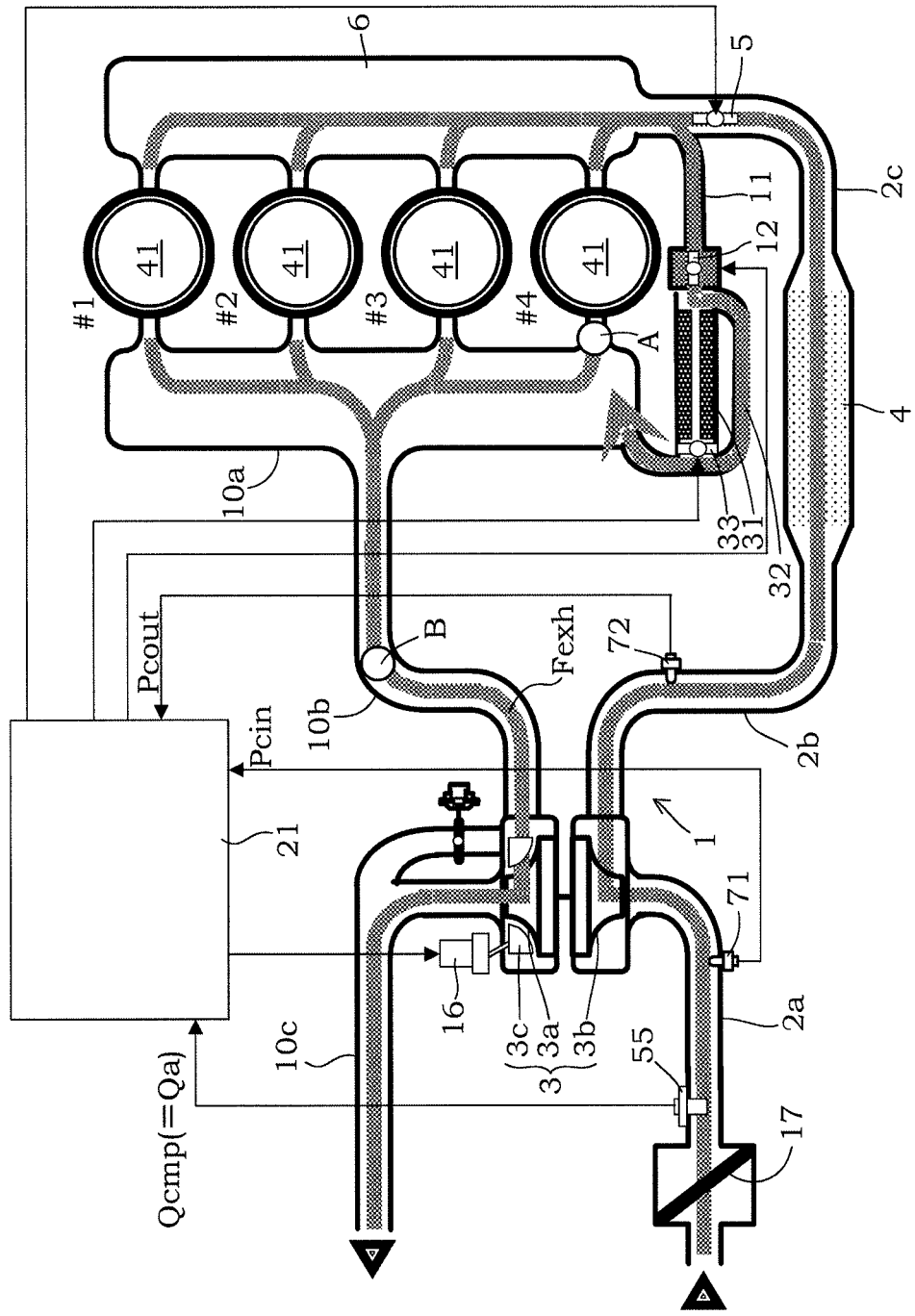
FIG. 11B is a schematic constitutional view illustrating the essential parts of the engine and a close-up of the turbo charger of the third embodiment.

FIGS. 11A and 11B are schematic constitutional views illustrating the essential parts of the engine 1 and a close-up of the turbo charger 3 in a third embodiment. FIG. 11A illustrates a state before opening the EGR valve 12 when the state of the turbo charger 3 is in a gas flow stagnation region, and FIG. 11B illustrates a state after opening the EGR valve 12 when the state of the turbo charger 3 is in the gas flow stagnation region. Those portions which are identical to FIGS. 2A and 2B of the first embodiment will be assigned identical reference numerals.

In the first embodiment, the engine controller 21 determined whether the engine operation conditions are in the gas flow stagnation region based on whether all of the conditions in <1> to <3> are satisfied. On the other hand, in the third embodiment, the engine controller 21 determines whether the state of the turbo charger 3 is in the gas flow stagnation region based on whether an operation point of the intake compressor 3b is in a gas flow stagnation region, which has been preset on a compressor performance curve (intake compressor performance curve characteristics). More specifically, in the first embodiment, it was determined whether the engine operation conditions are in the gas flow stagnation region, whereas in the third embodiment, it is determined whether the state of the turbo charger 3 is in the gas flow stagnation region similar to the second embodiment. Herein, "the state of the turbo charger 3 is in the gas flow stagnation region" is a concept including a case in which the operation point of the intake compressor is in the gas flow stagnation region on the compressor performance curve and a case in which the operation point of the exhaust turbine is in the gas flow stagnation region on the turbine performance curve.

Figure 13:
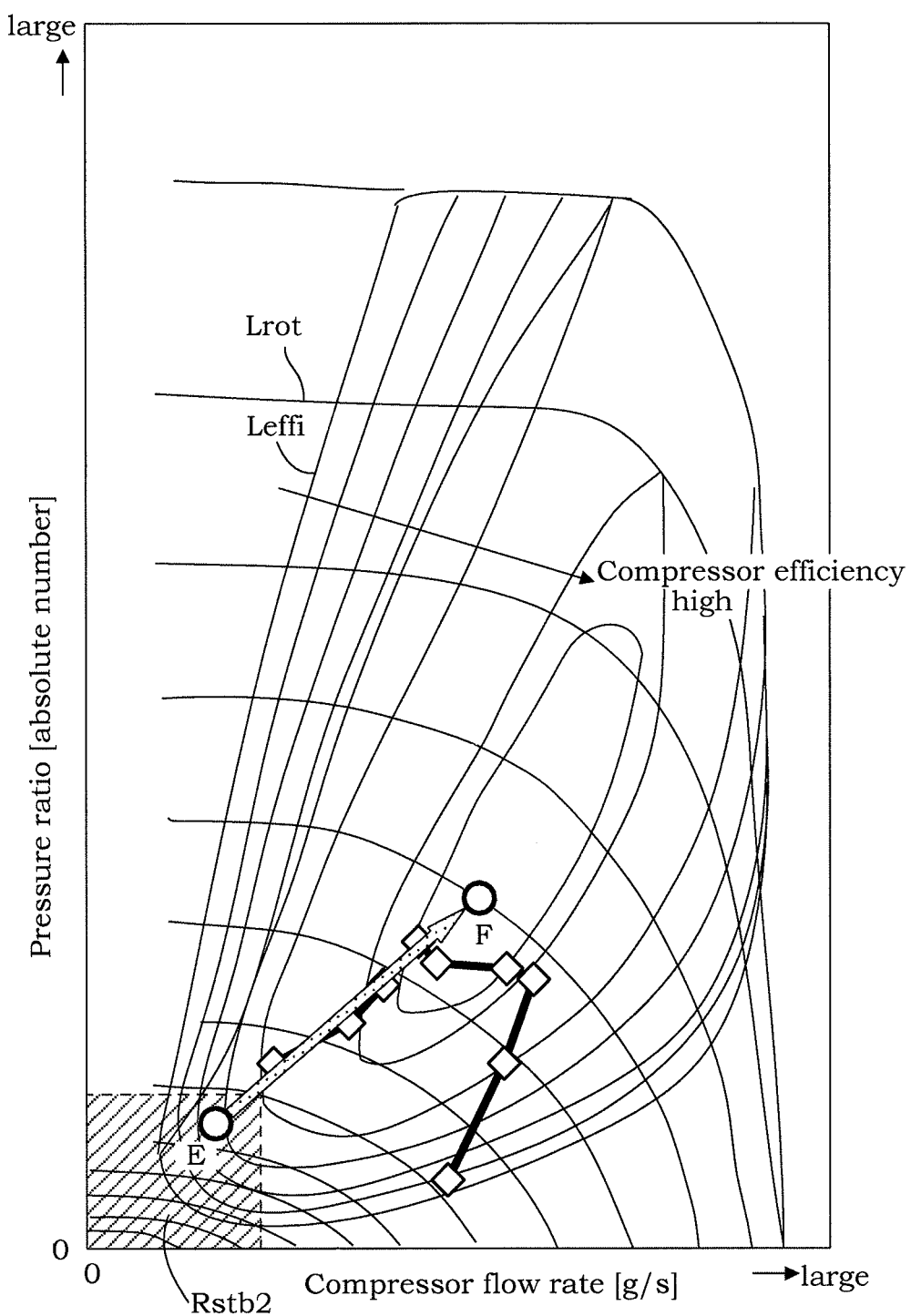
FIG. 13 is a compressor performance curve of the third embodiment.

The operation point of the intake compressor 3b is an operation point of the intake compressor 3b determined from a pressure ratio and a compressor flow rate in the compressor performance curve shown in FIG. 13. In order to know the operation point of the intake compressor 3b, it is necessary to find the pressure ratio of the intake compressor 3b and the compressor flow rate (flow rate flowing through the intake compressor 3b). The pressure ratio of the intake compressor 3b is the ratio of an outlet pressure Pcout of the intake compressor 3b and the inlet pressure Pcin of the intake compressor 3b, and is calculated by the following equation.

$$\text{Pressure Ratio} = P\text{cout}/P\text{cin} \qquad (3)$$

Therefore, the outlet pressure Pcout of the intake compressor 3b is detected by an outlet pressure sensor 72 provided in the intake pipe 2b downstream of the intake compressor 3b and upstream of the intercooler 4 as shown in FIGS. 11A and 11B. The inlet pressure Pcin of the intake compressor 3b is detected by an inlet pressure sensor 71 provided in the intake pipe 2a downstream of the air flowmeter 55 and upstream of the intake compressor as shown in FIGS. 11A and 11B. The compressor flow rate Qcmp is detected by the air flowmeter 55 as shown in FIGS. 11A and 11B. The outlet pressure Pcout of the intake compressor 3b, the inlet pressure Pcin of the intake compressor 3b, and the compressor flow rate Qcmp detected by the sensors 72, 71, and 55 are input into the engine controller 21.

Figure 12:
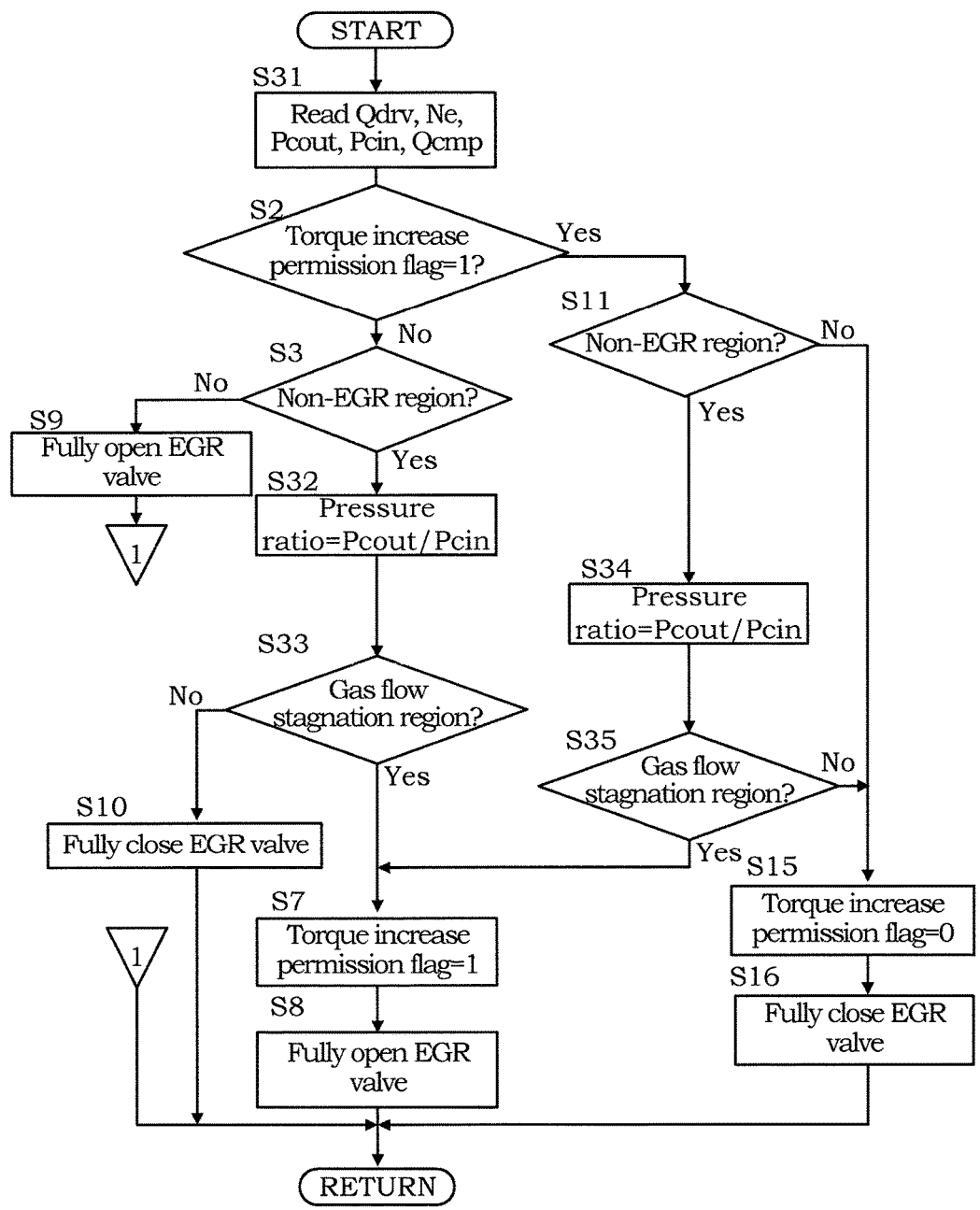
FIG. 12 is a flowchart for explaining the opening/closing control of an EGR valve in the third embodiment.

Referring to FIG. 12, the control executed by the engine controller 21 will now be explained. FIG. 12 is a flowchart for explaining the opening/closing control of the EGR valve 12 in the third embodiment. This control is executed at fixed time intervals (for example, every 10 ms). Processes which are identical to those in the flowchart of FIG. 5 for the first embodiment will be assigned the same reference numerals.

The processes which differ from those of the flowchart of FIG. 5 for the first embodiment are Steps 31 to 35. In relation to the first embodiment, Steps 4 to 6 of FIG. 5 of the first embodiment are replaced with Steps 32 and 33 of FIG. 12 of the third embodiment. Further, Steps 12 to 14 of FIG. 5 of the first embodiment are replaced with Steps 34 and 35 of FIG. 12 of the third embodiment.

As shown in FIG. 12, in Step 31, the engine controller 21 reads the main fuel injection amount Qdrv, the engine rotation speed Ne, the outlet pressure Pcout of the intake compressor 3b, the inlet pressure Pcin of the intake compressor 3b, and the compressor flow rate Qcmp. The outlet pressure Pcout of the intake compressor 3b is detected by the outlet pressure sensor 72, the inlet pressure Pcin of the intake compressor 3b is detected by the inlet pressure sensor 71, and the compressor flow rate Qcmp [g/s] is detected by the air flowmeter 55.

If it is determined in Step 3 that the engine operation conditions are in the non-EGR region, the engine controller 21 executes the process of Step 32 to calculate the pressure ratio [dimensionless number] of the intake compressor 3b from the outlet pressure Pcout of the intake compressor 3b and the inlet pressure Pcin of the intake compressor 3b using the above-mentioned equation (3).

In Step 33, the engine controller 21 determines whether the operation point of the intake compressor 3b, which is determined from the pressure ratio of the intake compressor 3b and the compressor flow rate, is in a gas flow stagnation region Rstb2 (refer to the hatched region) on the compressor performance curve shown in FIG. 13.

Herein, in the compressor performance curve, the compressor flow rate [g/s] is shown on the horizontal axis, and the pressure ratio [dimensionless number] of the intake compressor 3b is shown on the vertical axis. The compressor performance curve shows how the operation point of the intake compressor 3b changes due to differences in the engine operation conditions; In FIG. 13, "Leffi" represents an equivalent compressor efficiency line, and "Lrot" represents a line in which the exhaust turbine 3a rotation speed is fixed. In the intake compressor 3b used in current engines and the engine 1 of the present embodiment, the position of the operation point of the intake compressor 3b moves, for example, as shown by the square marks in FIG. 13 due to changes in the engine operation conditions. In current engines, the compressor operation point when starting the vehicle is at the position of point E, where both the pressure ratio and the compressor flow rate are small. Therefore, the gas flow stagnation region Rstb2 is predetermined so as to include the operation point (point E) of the intake compressor 3b when starting the vehicle in current engines as well as the region on the side in which the pressure ratio and compressor flow rate are smaller than those at the point E. In FIG. 13, the gas flow stagnation region Rstb2 is set so as to cover up to a region on the side in which the pressure ratio and compressor flow rate are slightly larger than those at the point E. This is because fluctuations exist in the operation point of the intake compressor 3b when starting the vehicle, and thus the gas flow stagnation region Rstb2 is set in consideration of such fluctuations.

Returning to FIG. 12, when it is determined in Step 33 that the operation point of the intake compressor 3b is not in the gas flow stagnation region Rstb2 shown in FIG. 13, in Step 10, the engine controller 21 controls the EGR valve 12 to a fully closed state.

On the other hand, if it is determined in Step 33 that the operation point of the intake compressor 3b is in the gas flow stagnation region Rstb2 shown in FIG. 13, the engine controller 21 determines that the state of the turbo charger 3 is in the gas flow stagnation region. In this case, the engine controller 21 sets the torque increase permission flag to 1 in Step 7 and opens the EGR valve 12 in Step 8 in order to permit an increase in the engine torque.

If it is determined in Step 2 that the torque increase permission flag is 1, the engine controller 21 executes the process of Step 11. If it is determined in Step 11 that the engine control conditions are in the non-EGR region, in Step 34, the engine controller 21 calculates the pressure ratio of the intake compressor 3b in the same manner as in Step 32. In Step 35, the engine controller 21 determines whether the compressor operation point determined from the pressure ratio and the compressor flow rate is in the gas flow stagnation region Rstb2 shown in FIG. 13. If the operation point of the intake compressor 3b is in the gas flow stagnation region Rstb2 shown in FIG. 13, the engine controller 21 determines that the state of the turbo charger 3 continues to be in the gas flow stagnation region. In this case, the engine controller 21 executes the processes of Steps 7 and 8.

When the EGR valve 12 is opened in Step 8, fresh air of the intake pipe 2c downstream of the intercooler 4 flows into the exhaust manifold 10a via the EGR passage 11 and the bypass passage 32 as shown in FIG. 11B. Unburned fuel in the exhaust gas that has exited from the cylinders 41 into the exhaust manifold 40a after-burns due to the fresh air, and the temperature and pressure of exhaust gas flowing into the exhaust turbine 3a rise. In other words, the turbine inlet pressure (expansion ratio) increases and the gas flow rate of gas flowing through the exhaust turbine 3a increases compared to before the EGR valve 12 was opened. Thereby, the rotation speed of the exhaust turbine 3a increases accordingly, and the rotation speed of the intake compressor which is coaxial with the exhaust turbine 3a also increases. Thus, the outlet pressure (pressure ratio) of the intake compressor 3b increases and the compressor flow rate increases compared to before the EGR valve 12 was opened. This means that, in the third embodiment, the operation point of the intake compressor 3b when starting the vehicle moves to a point F in FIG. 13 at which the pressure ratio is higher than at the point E and the compressor flow rate is higher than at the point E. At the operation point of the point F, since the compressor flow rate is higher than at the point E, the rotation speed of the intake compressor 3b increases accordingly. As a result, the actual supercharging pressure rises to the target supercharging pressure, and the actual engine torque increases. At the operation point of the point F, the compressor efficiency is also higher than at the point E, and thereby the turbo charger 3 can be operated efficiently.

On the other hand, if it is determined in Step 35 that the compressor operation point is outside of the gas flow stagnation region Rstb2, the engine controller 21 sets the torque increase permission flag to 0 in Step 15, and controls the EGR valve 12 to a fully closed state in Step 16.

In the third embodiment, when the state of the turbo charger 3 deviates from the gas flow stagnation region Rstb2 after the increase in the engine torque has been permitted, the EGR valve 12 is fully closed. However, the present embodiment is not limited thereto. For example, the EGR valve 12 can be controlled to a fully closed state when a certain predetermined duration of time has elapsed from the timing at which the engine torque increase was permitted. The fixed duration of time is set as a time during which the driver desires an acceleration feeling when starting the vehicle. Alternatively, the EGR valve 12 can be controlled to a fully closed state when either the state of the turbo charger 3 has deviated from the gas flow stagnation region Rstb2 or the fixed duration of time has passed from the timing at which the engine torque increase was permitted.

In the third embodiment, the engine 1 includes the air flowmeter 55 and the engine controller 21. The engine controller 21 calculates the pressure ratio, and stores a compressor performance curve (intake compressor performance curve characteristics) using the calculated pressure ratio and the compressor flow rate as parameters. The engine controller 21 determines whether the state of the turbo charger 3 is in the gas flow stagnation region based on whether a compressor operation point, which is determined from the pressure ratio and the compressor flow rate Qcmp, is in the gas flow stagnation region, which has been preset on the intake compressor performance curve characteristics.

Thereby, it can be determined whether the state of the turbo charger 3 is in the gas flow stagnation region without using an expensive sensor such as the $O_2$ concentration sensor 53, and without being based on the engine operation conditions.

In order to manage the operation of the turbo charger 3, the engine 1 has an intake compressor 3b monitoring device consisting of the sensors 55, 71, and 72 and the engine controller 21. Using the sensors 55, 71, and 72 and the engine controller 21, the intake compressor 3b monitoring device finds the pressure ratio and the compressor flow rate and monitors where the operation point of the intake compressor 3b, which is determined from the pressure ratio and the compressor flow rate, is located on the compressor performance curve shown in FIG. 13. Therefore, if the intake compressor 3b monitoring device already exists in the engine 1, then it can be determined whether the state of the turbo charger 3 is in the gas flow stagnation region by merely adding software (the flow of FIG. 12), and thus cost increases can be avoided.

In addition, the third embodiment can be combined with the second embodiment. In this case, the engine controller 21 determines whether the state of the turbo charger 3 is in the gas flow stagnation region based on the operation point of the exhaust turbine 3a, and determines whether the state of the turbo charger 3 is in the gas flow stagnation region based on the operation point of the intake compressor 3b. Thus, the engine controller 21 opens the EGR valve 12 if it is determined by either of the above that the state of the turbo charger 3 is in the gas flow stagnation region, or if it is determined by both of the above that the state of the turbo charger 3 is in the gas flow stagnation region.

Fourth Embodiment

Figure 14A:
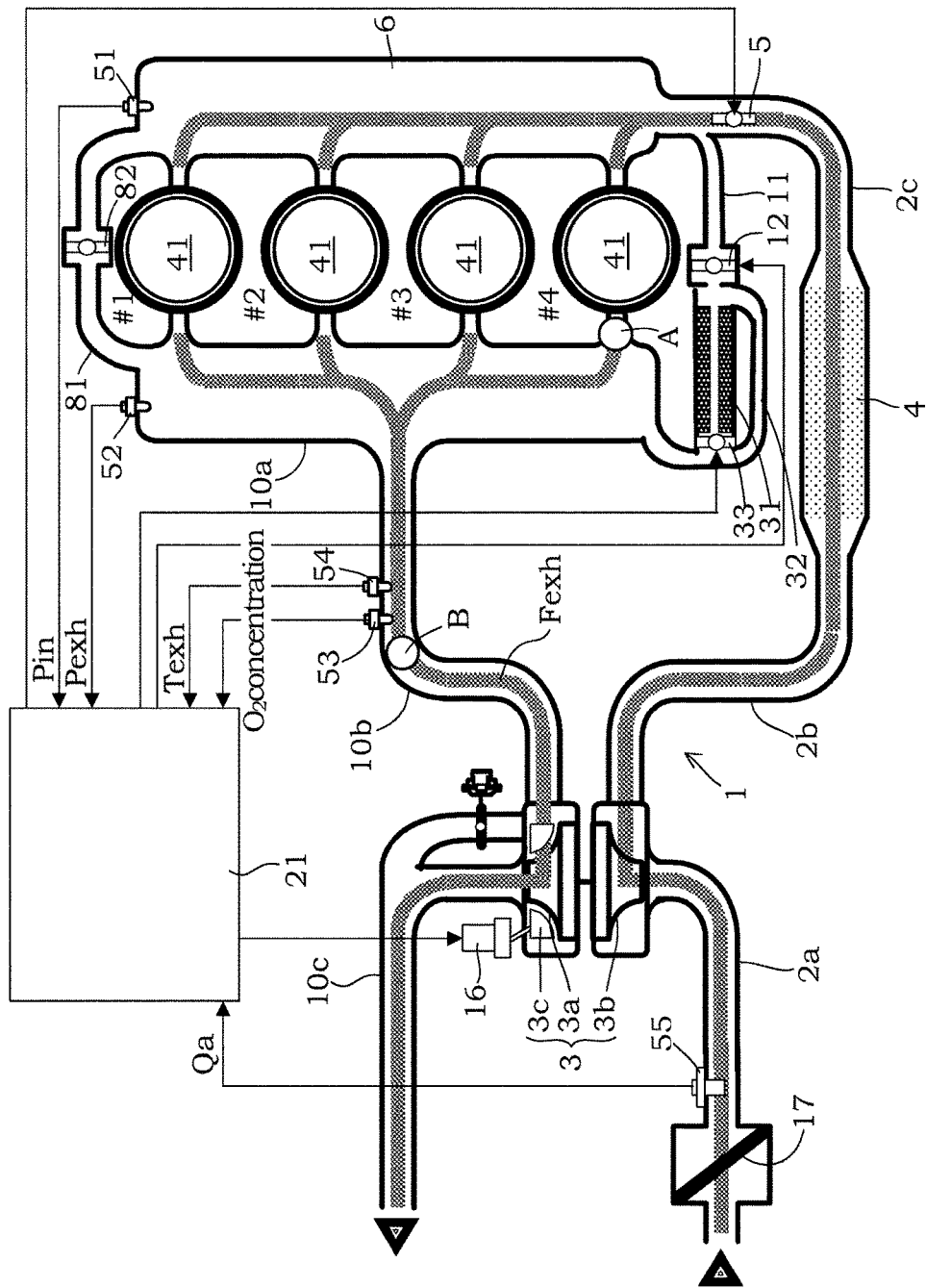
FIG. 14A is a schematic constitutional view illustrating the essential parts of the engine and a close-up of a turbo charger of a fourth embodiment.
Figure 14B:
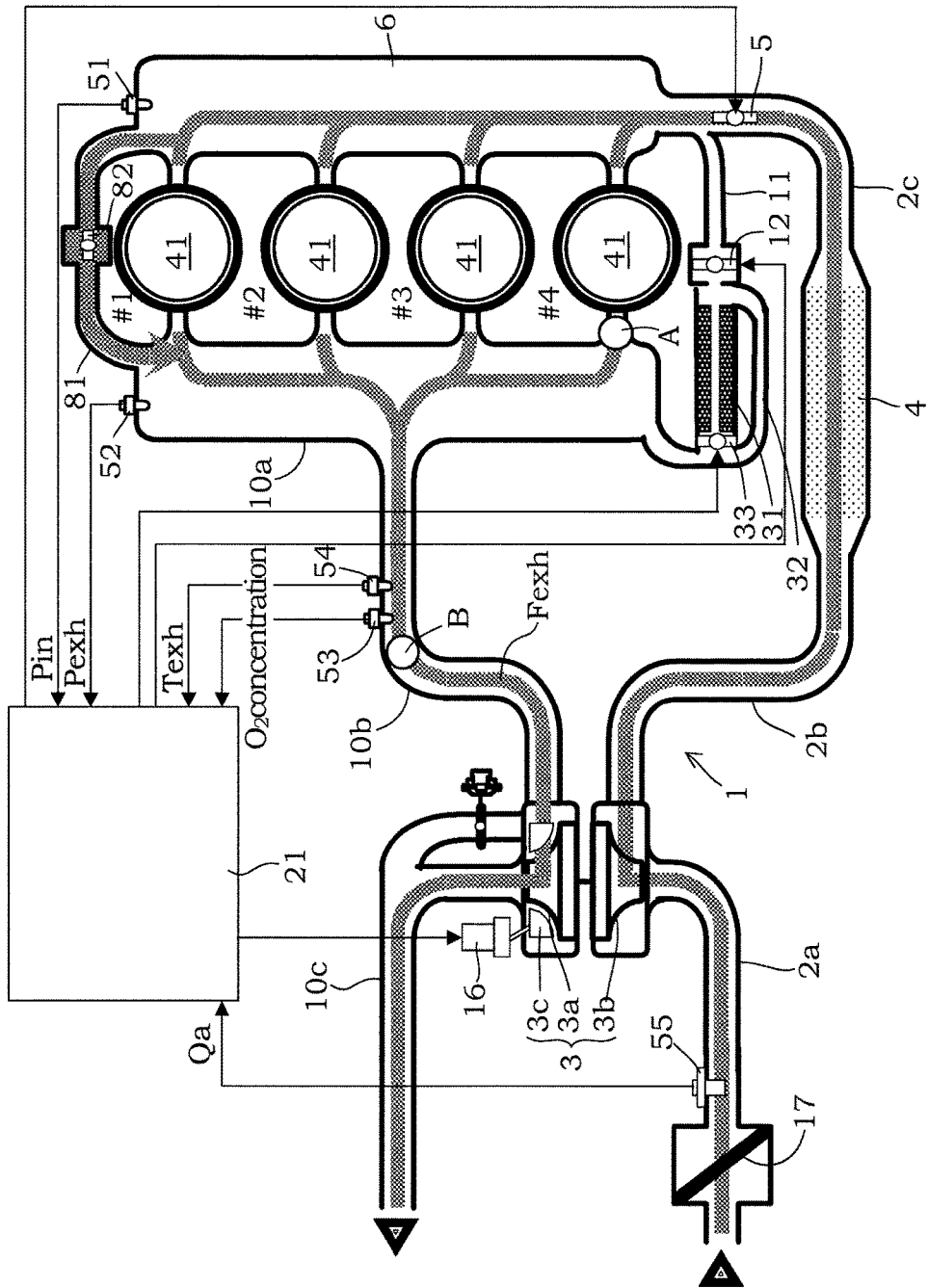
FIG. 14B is a schematic constitutional view illustrating the essential parts of the engine and a close-up of the turbo charger of the fourth embodiment.

FIGS. 14A and 14B are schematic constitutional views illustrating the essential parts of the engine 1 and a close-up of the turbo charger 3 in a fourth embodiment. FIG. 14A illustrates a state before opening a bypass valve 82 when the engine operation conditions are in the gas flow stagnation region, and FIG. 14B illustrates a state after opening the bypass valve 82 when the engine operation conditions are in the gas flow stagnation region. Those portions which are identical to FIGS. 2A and 2B of the first embodiment will be assigned identical reference numerals.

In the first embodiment, fresh air of the intake pipe 2c downstream of the intake compressor 3b was made to flow into the exhaust manifold 10a by opening the EGR valve 12 in the gas flow stagnation region. As shown in FIGS. 14A and 14B, the engine 1 according to the fourth embodiment also includes, separate from the EGR passage 11, a bypass passage 81 that bypasses the cylinders 41 to establish communication between the intake air collector 6 and the exhaust manifold 10a, and a normally-closed bypass valve 82 that opens/closes the bypass passage 81. In FIGS. 14A and 14B, the bypass passage 81 is provided outside of the #1 cylinder 41 along the #1 cylinder 41, but the position at which the bypass passage 81 is provided is not limited thereto.

In the fourth embodiment, it is determined whether the engine operation conditions are in the gas flow stagnation region similar to the first embodiment. The engine controller 21 opens the bypass valve 82 when the engine operation conditions are in the gas flow stagnation region such as when starting the vehicle, and thereby fresh air downstream of the intake compressor 3b is made to flow into the exhaust manifold 10a.

Figure 15:
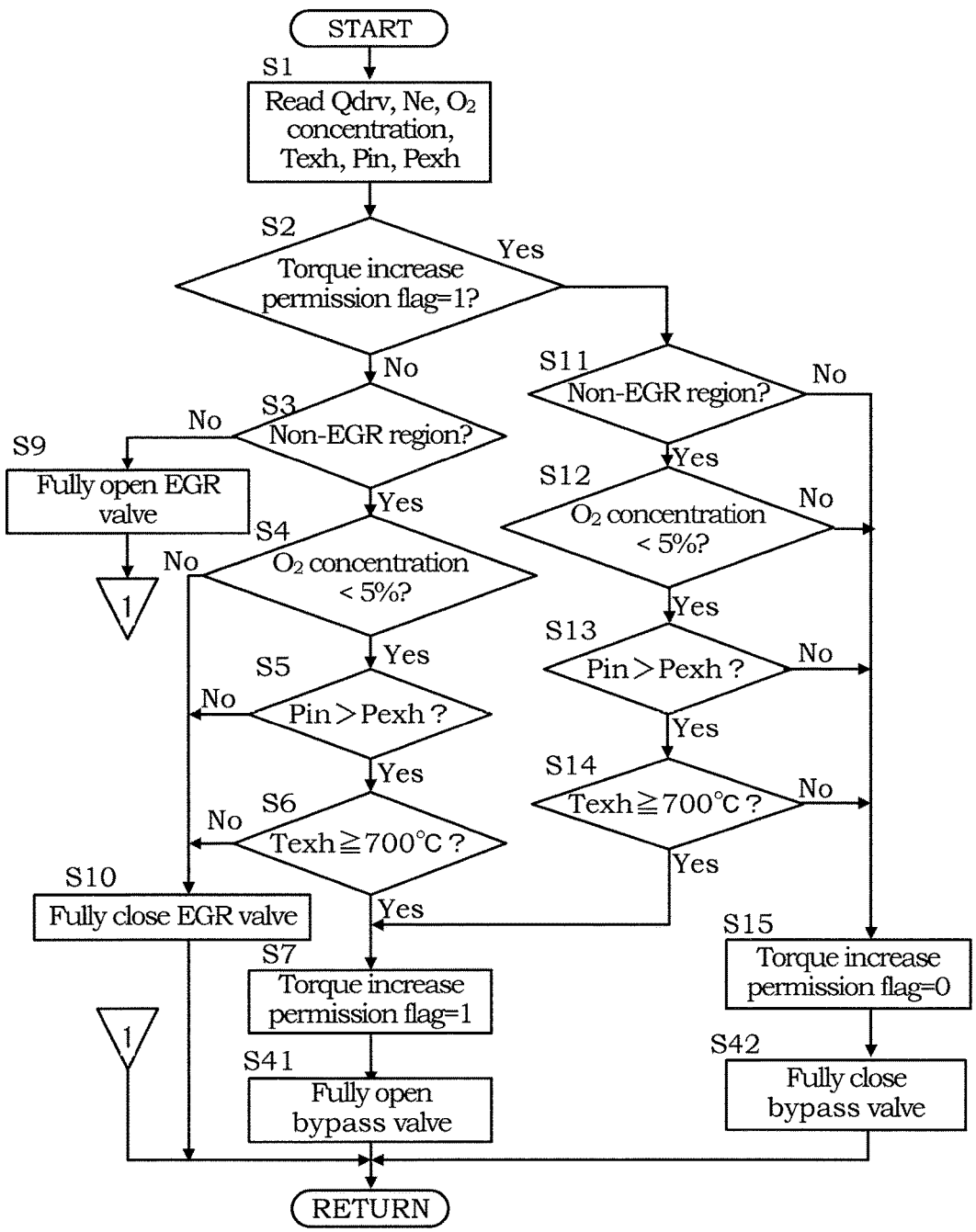
FIG. 15 is a flowchart for explaining the opening/closing control of an EGR valve and a bypass valve in the fourth embodiment.

Referring to FIG. 15, the control executed by the engine controller 21 will now be explained. FIG. 15 is a flowchart for explaining the opening/closing control of the EGR valve 12 and the bypass valve 82 in the fourth embodiment. This control is executed at fixed time intervals (for example, every 10 ms). Processes which are identical to those in the flowchart of FIG. 5 for the first embodiment will be assigned the same reference numerals.

The processes which differ from those in the flowchart of FIG. 5 of the first embodiment are the processes of Steps 41 and 42.

As shown in FIG. 15, if it is determined in Steps 4, 5, and 6 that the engine operation conditions are in the gas flow stagnation region, the engine controller 21 executes the processes of Steps 7 and 41 in order to permit an increase in the engine torque. The engine controller 21 sets the torque increase permission flag to 1 in Step 7, and controls the bypass valve 82 to a fully opened state in Step 41. In the first embodiment, the engine controller 21 performed control to open the EGR valve 12, but in the fourth embodiment, the engine controller 21 opens the bypass valve 82 instead of the EGR valve 12, and thus it is not necessary to execute control to open the EGR valve 12.

As shown in FIG. 14B, when the bypass valve 82 is opened, fresh air of the intake pipe 2c downstream of the intercooler 4 is supplied to the exhaust manifold 10a via the bypass passage 81. Since fresh air of the intake pipe 2c downstream of the intercooler 4 is supplied to the exhaust manifold 10a without passing through the cylinders 41, unburned fuel in the exhaust gas that has exited from the cylinders 41 to the exhaust manifold 10a is after-burned using this fresh air. Thereby, the temperature and pressure of exhaust gas flowing into the exhaust turbine 3a rise compared to the case in which fresh air is not introduced into the exhaust manifold 10a. If the temperature and pressure of exhaust gas flowing into the exhaust turbine 3a rise, volumetric expansion of the after-burned fresh air also occurs, and thus the work load of the exhaust turbine 3a increases. Therefore, the rotation speed of the intake compressor 3b which is coaxial with the exhaust turbine 3a rises, and the actual supercharging pressure also rises accordingly. If the supercharging pressure rises, the actual amount of air flowing into the cylinders 41 increases, and thus the combustion state of the fuel in the gas within the cylinders 41 improves and the actual engine torque increases.

If it is determined in Step 2 that the torque increase permission flag is 1, the engine controller 21 executes the process of Step 11. Steps 11 to 14 are processes for establishing the conditions for cancelling the permission for torque increase after the engine torque increase has been permitted. In Steps 11 to 14, the engine controller 21 determines whether the above-described conditions <11> to <14> are satisfied. If one of the conditions is satisfied, then it is determined that the conditions for cancelling the permission for torque increase have been met. When the cancellation conditions have been met, the engine controller 21 returns the torque increase permission flag to 0 in Step 15, and controls the bypass valve 82 to a fully closed state in Step 42.

If the conditions for cancelling the permission for torque increase have not been met, the engine controller 21 continues the processes of Steps 7 and 41.

In the fourth embodiment, the bypass valve 82 is controlled to a fully closed state when the conditions for cancelling the permission for torque increase have been met after the engine torque increase has been permitted. However, the present embodiment is not limited thereto. For example, the bypass valve 82 can be controlled to a fully closed state when a certain predetermined duration of time has elapsed from the timing at which the engine torque increase was permitted. The fixed duration of time is set as a time during which the driver desires an acceleration feeling when starting the vehicle. Alternatively, the bypass valve 82 can be controlled to a fully closed state when either the conditions for cancelling the permission for torque increase have been met or the fixed duration of time has passed from the timing at which the engine torque increase was permitted.

In the fourth embodiment, the fresh air/secondary air supply device is constituted by the bypass passage 81 and the normally-closed bypass valve 82 that opens/closes the bypass passage 81. The bypass passage 81 bypasses the cylinders 41 to establish communication between the intake passage downstream of the intake compressor 3b and the exhaust manifold 10a. If the engine operation conditions are in the gas flow stagnation region, the engine controller 21 executes bypass valve control to open the bypass valve 82 and supply fresh air downstream of the intake compressor 3b to the exhaust manifold 10a. In the fourth embodiment, similar to the first embodiment, by supplying fresh air to the exhaust manifold 10a in the gas flow stagnation region, the actual supercharging pressure rises compared to before supplying the fresh air. If the actual supercharging pressure rises, the actual engine torque can be increased by the amount of rise of the actual supercharging pressure.

Fifth Embodiment

Figure 16A:
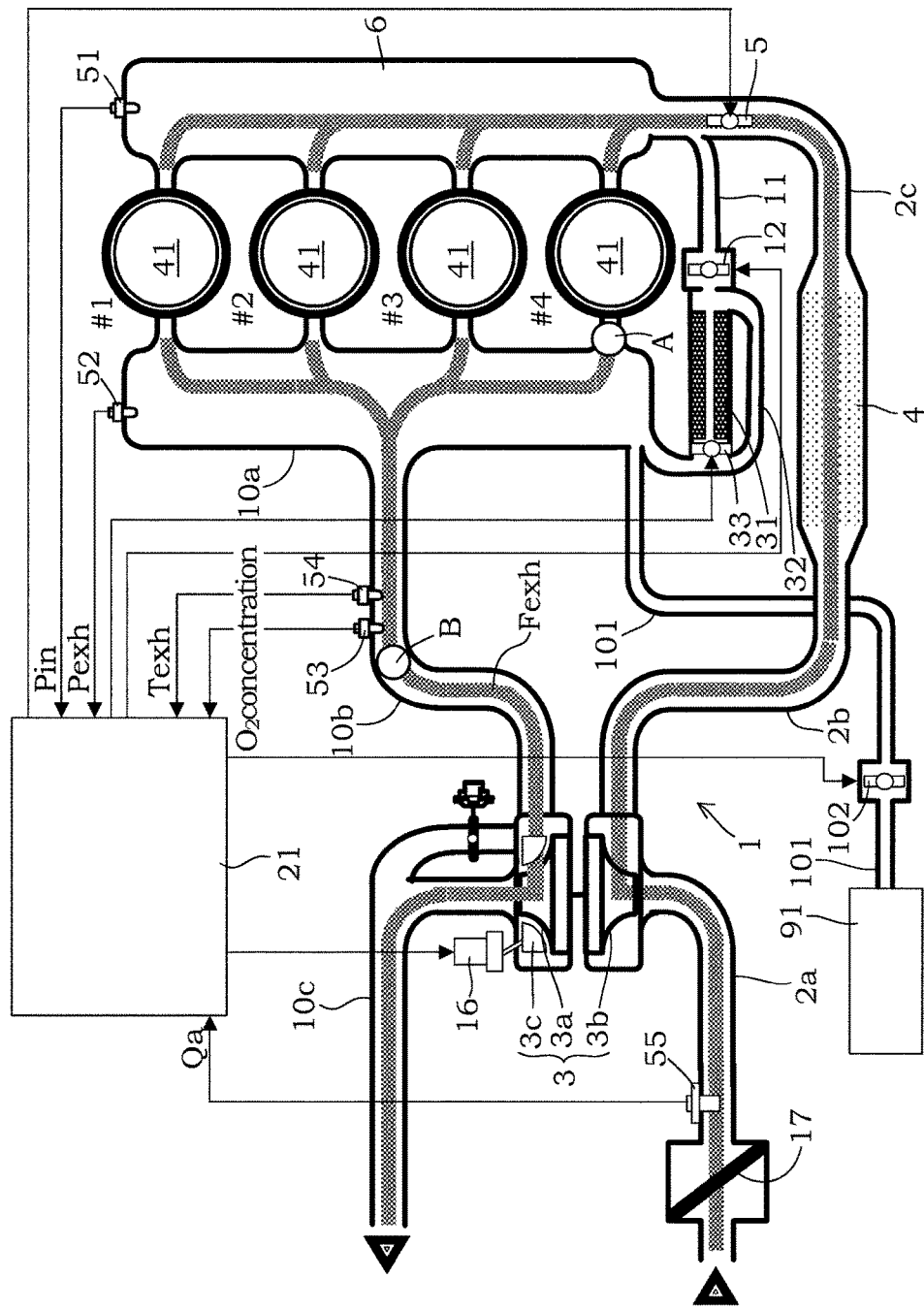
FIG. 16A is a schematic constitutional view illustrating the essential parts of the engine and a close-up of a turbo charger of a fifth embodiment.
Figure 16B:
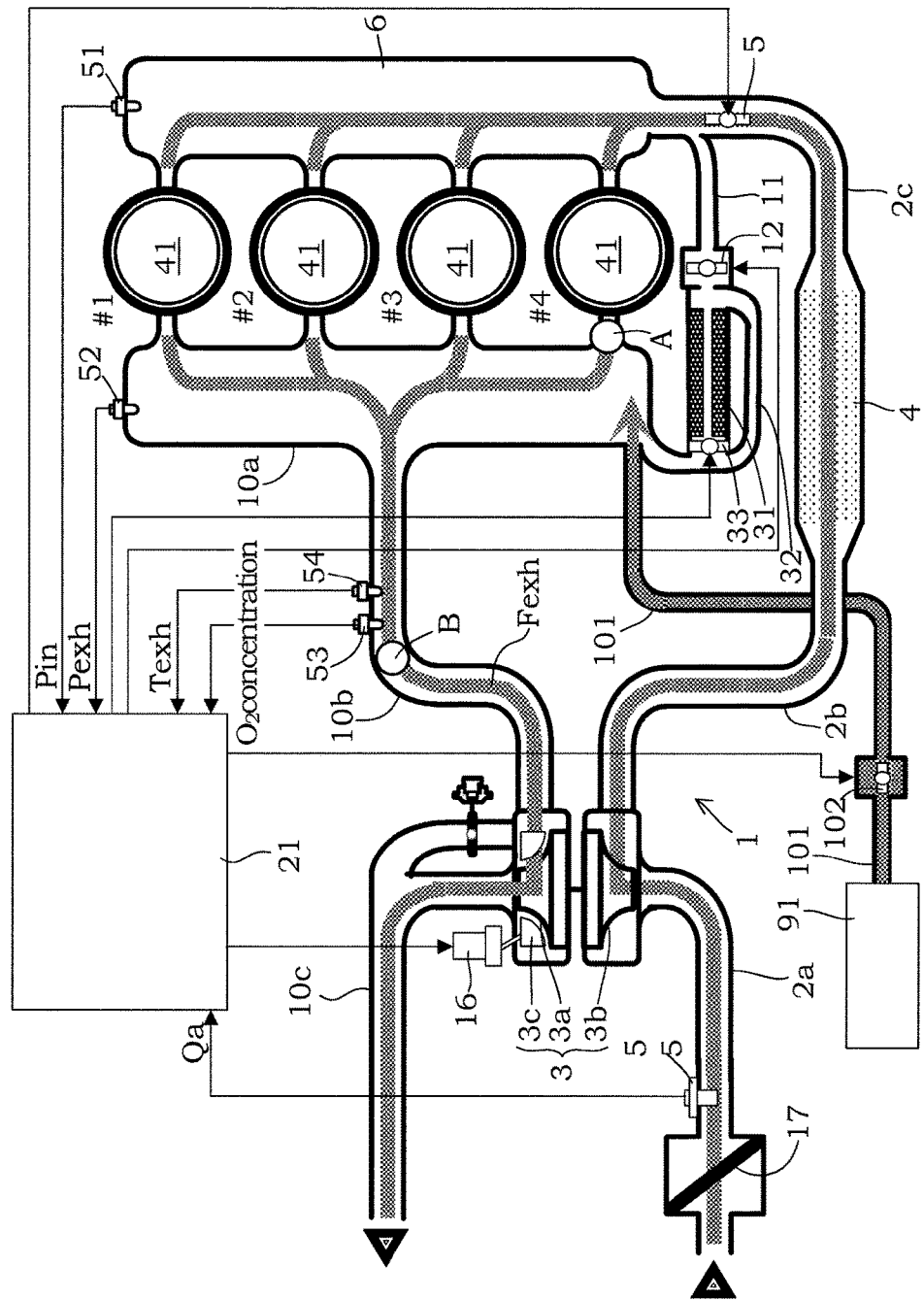
FIG. 16B is a schematic constitutional view illustrating the essential parts of the engine and a close-up of the turbo charger of the fifth embodiment.

FIGS. 16A and 16B are schematic constitutional views illustrating the essential parts of the engine 1 and a close-up of the turbo charger 3 in a fifth embodiment. FIG. 16A illustrates a state before opening a secondary air supply valve 102 when the engine operation conditions are in the gas flow stagnation region, and FIG. 16B illustrates a state after opening the secondary air supply valve 102 when the engine operation conditions are in the gas flow stagnation region. Those portions which are identical to FIGS. 2A and 2B of the first embodiment will be assigned identical reference numerals.

In the first to fourth embodiments, pressurized air generated by the turbo charger 3 was made to flow into the exhaust manifold 10a in the gas flow stagnation region such as when starting the vehicle. However, as shown in FIGS. 16A and 16B, the subject of the fifth embodiment is a case in which the vehicle in which the engine 1 is installed is a 7.5-ton class large truck or large bus equipped with a full air brake 91.

Figure 17:
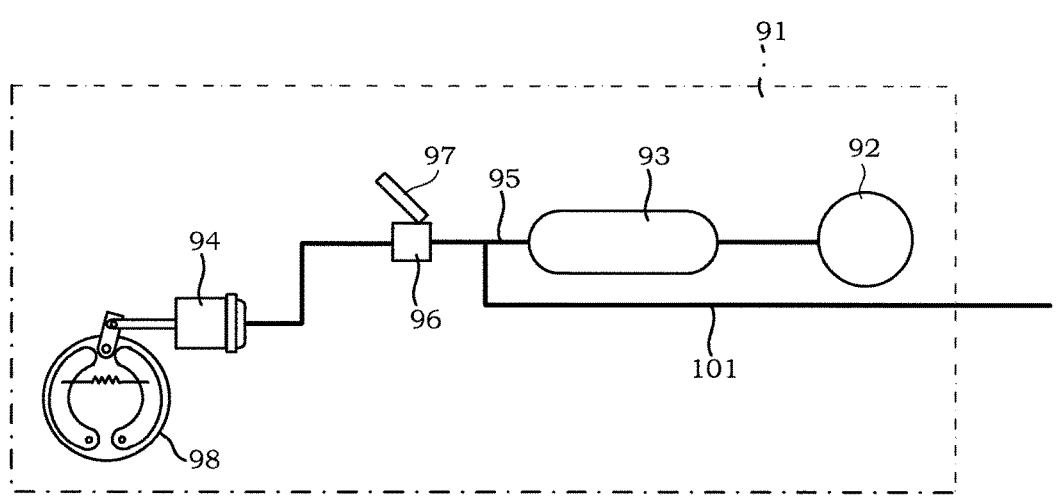
FIG. 17 a schematic constitutional view of a full air brake of the fifth embodiment.

Referring to FIG. 17, the full air brake 91 will now be explained. FIG. 17 is a schematic constitutional view of the full air brake 91.

As shown in FIG. 17, the full air brake 91 is constituted by an air compressor 92, an air tank 93, a brake valve 96, a brake pedal 97, an air chamber 94, and a wheel brake 98. The air chamber 94 and the wheel brake 98 are installed in each wheel of the vehicle.

The air compressor 92 is driven by the engine 1 via a gear or chain. Air that is pressurized by the air compressor 92 is stored in the air tank 93 at a fixed pressure. The normally-closed brake valve 96 is disposed in an air passage 95 that connects the air tank 93 and the air chamber 94.

In the full air brake 91 constituted as shown in FIG. 17, when the brake pedal 97 is depressed, the brake valve 96 is opened by an amount corresponding to the depressed amount (stroke) of the brake pedal 97, and pressurized air according to the depressed amount of the brake pedal 97 is sent from the air tank 93 to the air chamber 94 of each wheel. When the pressurized air is supplied to the air chamber 94 of each wheel, the wheel brake 98 of each wheel is operated by the pressurized air to brake the vehicle.

The pressure of the pressurized air within the air tank 93 is higher than the exhaust gas pressure of the exhaust manifold 10a in the non-EGR region (exhaust gas pressure upstream of the exhaust turbine in the gas flow stagnation region), and thus the pressurized air within the air tank 93 can be utilized as secondary air.

As shown in FIGS. 16A, 16B, and 17, the engine 1 according to the fifth embodiment includes a secondary air supply passage 101 that branches from the air passage 95 and converges in the exhaust manifold 10a, and the normally-closed secondary air supply valve 102 which opens/closes the secondary air supply passage 101. In FIGS. 16A and 16B, the secondary air supply passage 101 which branches from the air passage 95 is provided, but the present embodiment is not limited thereto. For example, the secondary air passage may be provided so as to establish communication between the air compressor 92 and the exhaust manifold 10a.

In the fifth embodiment, it is determined whether the engine operation conditions are in the gas flow stagnation region just as in the first embodiment. The engine controller 21 opens the secondary air supply valve 102 when the engine operation conditions are in the gas flow stagnation region such as when starting the vehicle, and thereby pressurized air within the air tank 93 is made to flow into the exhaust manifold 10a as secondary air.

Figure 18:
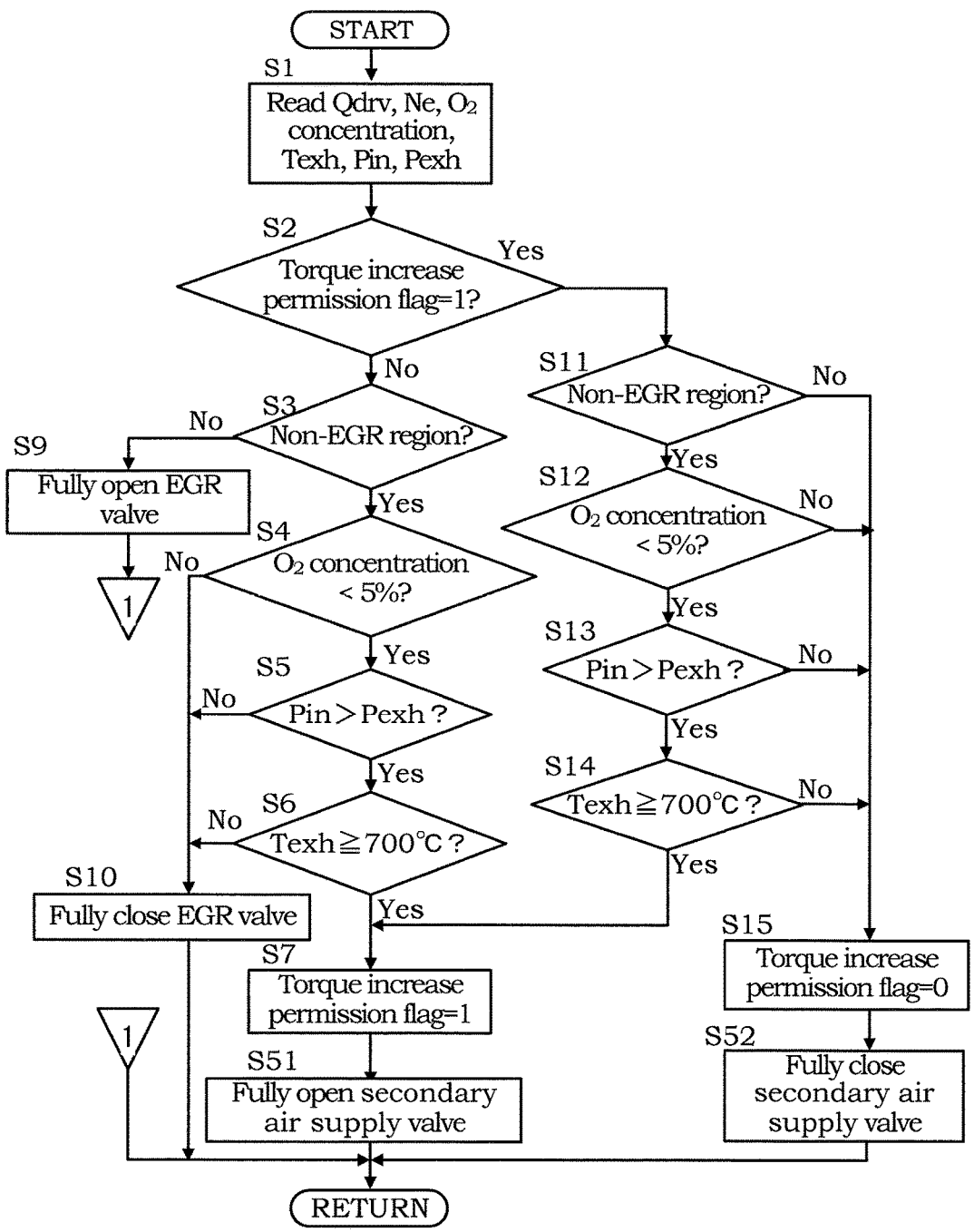
FIG. 18 is a flowchart for explaining the opening/closing control of an EGR valve and a secondary air supply valve in the fifth embodiment.

Referring to FIG. 18, the control executed by the engine controller 21 will now be explained. FIG. 18 is a flowchart for explaining the opening/closing control of the EGR valve 12 and the secondary air supply valve 102 in the fifth embodiment. This control is executed at fixed time intervals (for example, every 10 ms). Processes which are identical to those in the flowchart of FIG. 5 for the first embodiment will be assigned the same reference numerals.

The processes which differ from those in the flowchart of FIG. 5 of the first embodiment are the processes of Steps 51 and 52.

As shown in FIG. 18, if it is determined in Steps 4, 5, and 6 that the engine operation conditions are in the gas flow stagnation region, the engine controller 21 executes the processes of Steps 7 and 51 in order to permit an increase in the engine torque. The engine controller 21 sets the torque increase permission flag to 1 in Step 7, and opens the secondary air supply valve 102 in Step 51. In the first embodiment, the engine controller 21 performed control to open the EGR valve 12, but in the fifth embodiment, the engine controller 21 opens the secondary air supply valve 102 instead of the EGR valve 12, and thus it is not necessary to execute control to open the EGR valve 12.

As shown in FIG. 16B, when the secondary air supply valve 102 is opened, the pressure of the pressurized air (secondary air) within the air tank 93 is higher than that of the exhaust gas pressure of the exhaust manifold 10a, and thus the secondary air is supplied to the exhaust manifold 10a via the secondary air supply passage 101. Since the secondary air is supplied to the exhaust manifold 10a without passing through the cylinders 41, unburned fuel in the exhaust gas that has exited from the cylinders 41 to the exhaust manifold 10a is after-burned using this fresh air (secondary air). Thereby, the temperature and pressure of exhaust gas flowing into the exhaust turbine 3a rise compared to the case in which fresh air is not introduced into the exhaust manifold 10a. If the temperature and pressure of exhaust gas flowing into the exhaust turbine 3a rise, volumetric expansion of the after-burned fresh air also occurs, and thus the work load of the exhaust turbine 3a increases. Therefore, the rotation speed of the intake compressor 3b which is coaxial with the exhaust turbine 3a rises, and the actual supercharging pressure also rises accordingly. If the actual supercharging pressure rises, the actual amount of air flowing into the cylinders 41 increases, and thus the combustion state of the fuel in the gas within the cylinders 41 improves and the actual engine torque increases.

If it is determined in Step 2 that the torque increase permission flag is 1, the engine controller 21 executes the process of Step 11. Steps 11 to 14 are processes for establishing the conditions for cancelling the permission for torque increase after the engine torque increase has been permitted. In Steps 11 to 14, the engine controller 21 determines whether the above-described conditions <11> to <14> are satisfied. If one of the conditions is satisfied, then it is determined that the conditions for cancelling the permission for torque increase have been met. When the cancellation conditions have been met, the engine controller 21 returns the torque increase permission flag to 0 in Step 15, and controls the secondary air supply valve 102 to a fully closed state in Step 52.

If the conditions for cancelling the permission for torque increase have not been met, the engine controller 21 continues the processes of Steps 7 and 51.

In the fifth embodiment, the secondary air supply valve 102 is controlled to a fully closed state when the conditions for cancelling the permission for torque increase have been met after the engine torque increase has been permitted. However, the present embodiment is not limited thereto. For example, the secondary air supply valve 102 can be controlled to a fully closed state when a certain predetermined duration of time has elapsed from the timing at which the engine torque increase was permitted. The fixed duration of time is set as a time during which the driver desires an acceleration feeling when starting the vehicle. Alternatively, the secondary air supply valve 102 can be controlled to a fully closed state when either the conditions for cancelling the permission for torque increase have been met or the fixed duration of time has passed from the timing at which the engine torque increase was permitted.

In the fifth embodiment, the fresh air/secondary air supply device is constituted by the air tank 93, the secondary air supply passage 101, and the normally-closed secondary air supply valve 102 that opens/closes the secondary air supply passage 101. The air tank 93 stores air at a fixed pressure which is higher than that of exhaust gas of the exhaust manifold 10a (exhaust gas pressure upstream of the exhaust turbine) in the gas flow stagnation region. The secondary air supply passage 101 establishes communication between the air tank 93 and the exhaust manifold 10a (exhaust passage upstream of the exhaust turbine). If the engine operation conditions are in the gas flow stagnation region, the engine controller 21 executes secondary air supply valve control to open the secondary air supply valve 102 and supply pressurized air within the air tank 93 to the exhaust manifold 10a as secondary air.

According to the fifth embodiment, pressurized air within the air tank 93 is supplied to the exhaust manifold 10a as secondary air in the gas flow stagnation region, and thereby the actual supercharging pressure rises compared to before supplying the secondary air. If the actual supercharging pressure rises, the actual engine torque can be increased by the amount of rise of the actual supercharging pressure. In a large truck or bus, since the air tank 93 which is used for braking of the vehicle already exists, cost increases can be avoided.

In the fifth embodiment, the case of a large truck provided with the full air brake 91 was explained. However, the present embodiment is not limited thereto. The air compressor 92, the air tank 93, the secondary air supply passage 101 which connects the air tank 93 and the exhaust manifold 10a, and the normally-closed secondary air supply valve 102 which opens/closes the secondary air supply passage 101 can be provided separately to a vehicle.

Any one of the fourth and fifth embodiments can be combined with any one of the second and third embodiments. For example, if the fifth embodiment is combined with the third embodiment, the secondary air supply valve 102 will be opened when the operation point of the intake compressor 3b determined from the pressure ratio and the compressor flow rate is in the gas flow stagnation region shown in FIG. 13, and thereby fresh air will be supplied to the exhaust manifold 10a. Further, for example, if the fourth embodiment is combined with the second embodiment, the bypass valve 82 will be opened when the operation point of the exhaust turbine 3a determined from the expansion ratio and the gas flow rate is in the gas flow stagnation region shown in FIG. 10, and thereby secondary air will be supplied to the exhaust manifold 10a. In the case of such combinations, an EGR control device is unnecessary.

Embodiments of the present invention have been described above, but these embodiments are merely a portion of the application examples of the present invention, and the technical scope of the present invention is not meant to be limited to the concrete constitutions of the above embodiments.

The invention claimed is:

1. A control device for a diesel engine, comprising:
   a turbo charger that coaxially joins an intake compressor and an exhaust turbine and drives the intake compressor with energy of exhaust gas which flows into the exhaust turbine to pressurize intake air;
   a fresh air/secondary air supply device configured to supply fresh air or secondary air to an exhaust passage upstream of the exhaust turbine; and
   a controller that is programmed to:
      determine whether an engine operation condition is in a gas flow stagnation region in which an engine torque does not increase even when a fuel injection amount is increased and in which fresh air or secondary air can be supplied to the exhaust passage upstream of the exhaust turbine; and
      cause the fresh air/secondary air supply device to supply fresh air or secondary air to the exhaust passage upstream of the exhaust turbine when the engine operation condition is in the gas flow stagnation region.

2. A control device for a diesel engine, comprising:
   a turbo charger that coaxially joins an intake compressor and an exhaust turbine and drives the intake compressor with energy of exhaust gas which flows into the exhaust turbine to pressurize intake air;
   a fresh air/secondary air supply device configured to supply fresh air or secondary air to an exhaust passage upstream of the exhaust turbine;
   a gas flow rate detection unit configured to detect a gas flow rate of the exhaust turbine; and a controller that is programmed to:
  calculate an expansion ratio of the exhaust turbine;
  determine whether a state of the turbo charger is in a gas flow stagnation region on the basis of the gas flow rate and the expansion ratio; and
  cause the fresh air/secondary air supply device to supply fresh air or secondary air to the exhaust passage upstream of the exhaust turbine when the state of the turbo charger is in the gas flow stagnation region.

3. A control device for a diesel engine, comprising:
a turbo charger that coaxially joins an intake compressor and an exhaust turbine and drives the intake compressor with energy of exhaust gas which flows into the exhaust turbine to pressurize intake air;
a fresh air/secondary air supply device configured to supply fresh air or secondary air to an exhaust passage upstream of the exhaust turbine;
a compressor flow rate detection unit configured to detect a compressor flow rate of the intake compressor; and
a controller that is programmed to:
  calculate a pressure ratio of the intake compressor;
  determine whether a state of the turbo charger is in a gas flow stagnation region on the basis of the compressor flow rate and the pressure ratio; and
  cause the fresh air/secondary air supply device to supply fresh air or secondary air to the exhaust passage upstream of the exhaust turbine when the state of the turbo charger is in the gas flow stagnation region.

4. The control device for the diesel engine according to claim 1, wherein the fresh air/secondary air supply device comprises:
an EGR passage configured to recirculate a portion of the exhaust gas to an intake passage; and
an EGR valve configured to open/close the EGR passage,
wherein the controller is further programmed to open the EGR valve when the engine operation condition or the state of the turbo charger is in the gas flow stagnation region so as to supply fresh air downstream of the intake compressor to the exhaust passage upstream of the exhaust turbine.

5. The control device for the diesel engine according to claim 1, wherein the fresh air/secondary air supply device comprises:
a bypass passage configured to communicate between an intake passage downstream of the intake compressor and the exhaust passage upstream of the exhaust turbine; and
a bypass valve configured to open/close the bypass passage,
wherein the controller is further programmed to open the bypass valve when the engine operation condition or the state of the turbo charger is in the gas flow stagnation region so as to supply fresh air downstream of the intake compressor to the exhaust passage upstream of the exhaust turbine.

6. The control device for the diesel engine according to claim 1, wherein the fresh air/secondary air supply device comprises:
an air tank configured to store air at a fixed pressure that is higher than exhaust gas pressure upstream of the exhaust turbine in the gas flow stagnation region;
a secondary air supply passage configured to communicate between the air tank and the exhaust passage upstream of the exhaust turbine; and a secondary air supply valve configured to open/close the secondary air supply passage,
wherein the controller is further programmed to open the secondary air supply valve when the engine operation condition or the state of the turbo charger is in the gas flow stagnation region so as to supply pressurized air within the air tank as the secondary air to the exhaust passage upstream of the exhaust turbine.

7. A control device for a diesel engine, comprising:
a turbo charger that coaxially joins an intake compressor and an exhaust turbine and drives the intake compressor with energy of exhaust gas which flows into the exhaust turbine to pressurize intake air;
a fresh air/secondary air supply device configured to supply fresh air or secondary air to an exhaust passage upstream of the exhaust turbine; and
a controller that is programmed to:
  determine whether an engine operation condition is in a gas flow stagnation region in which an engine torque does not increase even when a fuel injection amount is increased and in which fresh air or secondary air can be supplied to the exhaust passage upstream of the exhaust turbine; and
  cause the fresh air/secondary air supply device to supply fresh air or secondary air to the exhaust passage upstream of the exhaust turbine when the engine operation condition is in the gas flow stagnation region,
wherein the control device further comprises an exhaust gas $O_2$ concentration detection unit configured to detect an $O_2$ concentration in the exhaust gas, and
wherein the controller is further programmed to:
  compare intake air pressure downstream of the intake compressor and exhaust gas pressure upstream of the exhaust turbine; and
  determine that the engine operation condition is in the gas flow stagnation region when the $O_2$ concentration in the exhaust gas is at least zero or an excess air ratio of gas within the cylinders is at least 1.0 and the intake air pressure downstream of the intake compressor is higher than the exhaust gas pressure upstream of the exhaust turbine.

8. The control device for the diesel engine according to claim 7, wherein the controller is further programmed to determine that the engine operation condition is in the gas flow stagnation region when an exhaust gas temperature upstream of the exhaust turbine is higher than a temperature at which after-burning of unburned fuel in the exhaust gas reliably occurs.

9. The control device for the diesel engine according to claim 1, wherein the gas flow stagnation region includes when starting a vehicle in which the diesel engine is installed or when the vehicle is climbing a hill.

10. A control method for a diesel engine which is equipped with a turbo charger that coaxially joins an intake compressor and an exhaust turbine and drives the intake compressor with energy of exhaust gas which flows into the exhaust turbine to pressurize intake air, and a fresh air/secondary air supply device configured to supply fresh air or secondary air to an exhaust passage upstream of the exhaust turbine, the method comprising:
determining whether an engine operation condition is in a gas flow stagnation region in which an engine torque does not increase even when a fuel injection amount is increased and in which fresh air or secondary air can be supplied to the exhaust passage upstream of the exhaust turbine; and causing the fresh air/secondary air supply device to supply fresh air or secondary air to the exhaust passage upstream of the exhaust turbine when the engine operation condition is in the gas flow stagnation region.

11. A control method for a diesel engine which is equipped with a turbo charger that coaxially joins an intake compressor and an exhaust turbine and drives the intake compressor with energy of exhaust gas which flows into the exhaust turbine to pressurize intake air, and a fresh air/secondary air supply device that supplies fresh air or secondary air to an exhaust passage upstream of the exhaust turbine, the method comprising:
 detecting a gas flow rate of the exhaust turbine;
 calculating an expansion ratio of the exhaust turbine;
 determining whether a state of the turbo charger is in a gas flow stagnation region on the basis of the gas flow rate and the expansion ratio; and
 causing the fresh air/secondary air supply device to supply fresh air or secondary air to the exhaust passage upstream of the exhaust turbine when the state of the turbo charger is in the gas flow stagnation region.

12. A control method for a diesel engine which is equipped with a turbo supercharger that coaxially joins an intake compressor and an exhaust turbine and drives the intake compressor with energy of exhaust gas which flows into the exhaust turbine to pressurize intake air, and a fresh air/secondary air supply device that supplies fresh air or secondary air to an exhaust passage upstream of the exhaust turbine, the method comprising:
 detecting a compressor flow rate of the intake compressor;
 calculating a pressure ratio of the intake compressor;
 determining whether a state of the turbo supercharger is in a gas flow stagnation region on the basis of the compressor flow rate and the pressure ratio; and
 causing the fresh air/secondary air supply device to supply fresh air or secondary air is supplied to the exhaust passage upstream of the exhaust turbine when the state of the turbo supercharger is in the gas flow stagnation region.

13. The control device for the diesel engine according to claim 2, wherein the controller is configured to store an exhaust turbine performance curve in which the gas flow stagnation region is established in advance according to the gas flow rate and the expansion ratio, and is further programmed to determine whether the state of the turbo charger is in the gas flow stagnation region by referring to the exhaust turbine performance curve.

14. The control device for the diesel engine according to claim 3, wherein controller is configured to store an intake compressor performance curve in which the gas flow stagnation region is established in advance according to the compressor flow rate and the pressure ratio, and is further programmed to determine whether the state of the turbo charger is in the gas flow stagnation region by referring to the intake compressor performance curve.

15. The control device for the diesel engine according to claim 1, wherein the controller is further programmed to determine that the engine operation condition is in the gas flow stagnation region when an oxygen concentration in the exhaust gas is less than a predetermined concentration, a pressure of the intake air after pressurized by the intake compressor is higher than a pressure in the exhaust gas upstream of the exhaust turbine, and a temperature of the exhaust gas upstream of the exhaust turbine is higher than a predetermined temperature.

* * * * *